United States Patent [19]
Gough et al.

[11] Patent Number: 5,638,501
[45] Date of Patent: Jun. 10, 1997

[54] METHOD AND APPARATUS FOR DISPLAYING AN OVERLAY IMAGE

[75] Inventors: Michael L. Gough, Ben Lomond; Daniel S. Venolia, Foster City; Thomas S. Gilley, Pleasanton; Greg M. Robbins; Daniel J. Hansen, Jr., both of Cupertino; Abhay Oswal, Fremont; Tommy H. Tam, San Jose, all of Calif.

[73] Assignee: Apple Computer, Inc., Cupertino, Calif.

[21] Appl. No.: 60,572

[22] Filed: May 10, 1993

[51] Int. Cl.⁶ .................................................. G06F 15/00
[52] U.S. Cl. .................................................. 395/135
[58] Field of Search .................................. 395/133, 135, 395/155, 161; 345/113, 114

[56] References Cited

U.S. PATENT DOCUMENTS

| | | | |
|---|---|---|---|
| 4,823,281 | 4/1989 | Evangelisti et al. | 364/518 |
| 4,868,765 | 9/1989 | Dieffendorff | 364/521 |
| 5,185,808 | 2/1993 | Cok | 382/1 |
| 5,283,867 | 2/1994 | Bayley et al. | 395/164 |
| 5,313,227 | 5/1994 | Aoki et al. | 345/118 |
| 5,313,571 | 5/1994 | Hirose et al. | 395/140 |
| 5,463,728 | 10/1995 | Blahut et al. | 395/158 |
| 5,467,443 | 11/1995 | Johnson et al. | 395/141 |
| 5,469,541 | 11/1995 | Kingman et al. | 395/158 |
| 5,475,812 | 12/1995 | Corona et al. | 395/158 |

OTHER PUBLICATIONS

Gui, "Method to Allow Users to Select Transparent Color for Windows", p. 206, Research Disclosure, Mar. 1993.

*Primary Examiner*—Phu K. Nguyen
*Attorney, Agent, or Firm*—Hickman Beyer & Weaver

[57] ABSTRACT

A method and apparatus for providing a translucent overlay image over a base image on the screen of a computer system. The method includes the steps of running an application program on a central processing unit (CPU) of a pen computer system to produce a base image in a screen coupled to the CPU; and running an overlay program on the CPU to produce an overlay image on the screen such that portions of the base image which are overlapped by the overlay image are at least partially visible through the overlay image. The overlay program is a computer implemented process comprising the steps of displaying an overlay image on the screen, intercepting screen inputs which contact the overlay image, processing the intercepted screen inputs in the CPU, and updating the application program based on the processed screen inputs. In addition a pen computer system includes a central processing unit (CPU), a screen assembly coupled to the CPU, a mechanism coupled to the screen assembly for displaying a base image on the screen assembly, and a mechanism coupled to the screen assembly for displaying an overlay image on the screen assembly such that portions of the base image which are overlapped by the overlay image are at least partially visible through the overlay image. The screen assembly includes a tablet mechanism coupled to the CPU which can receive input from a pen or stylus. The mechanism for displaying a base image includes a first computer implemented process running on the CPU which produces first video data and a video driver circuit coupled between the CPU and the screen assembly. The mechanism for displaying the overlay image includes a second computer implemented process running on the CPU to produce second video data, and a video driver circuit coupled between the CPU and the screen assembly. There is also a mechanism for blending the first video data and the second video data to produce a blended image on the screen assembly. This blending mechanism can include the second computer implemented process, or can comprise the video driver circuitry.

27 Claims, 22 Drawing Sheets

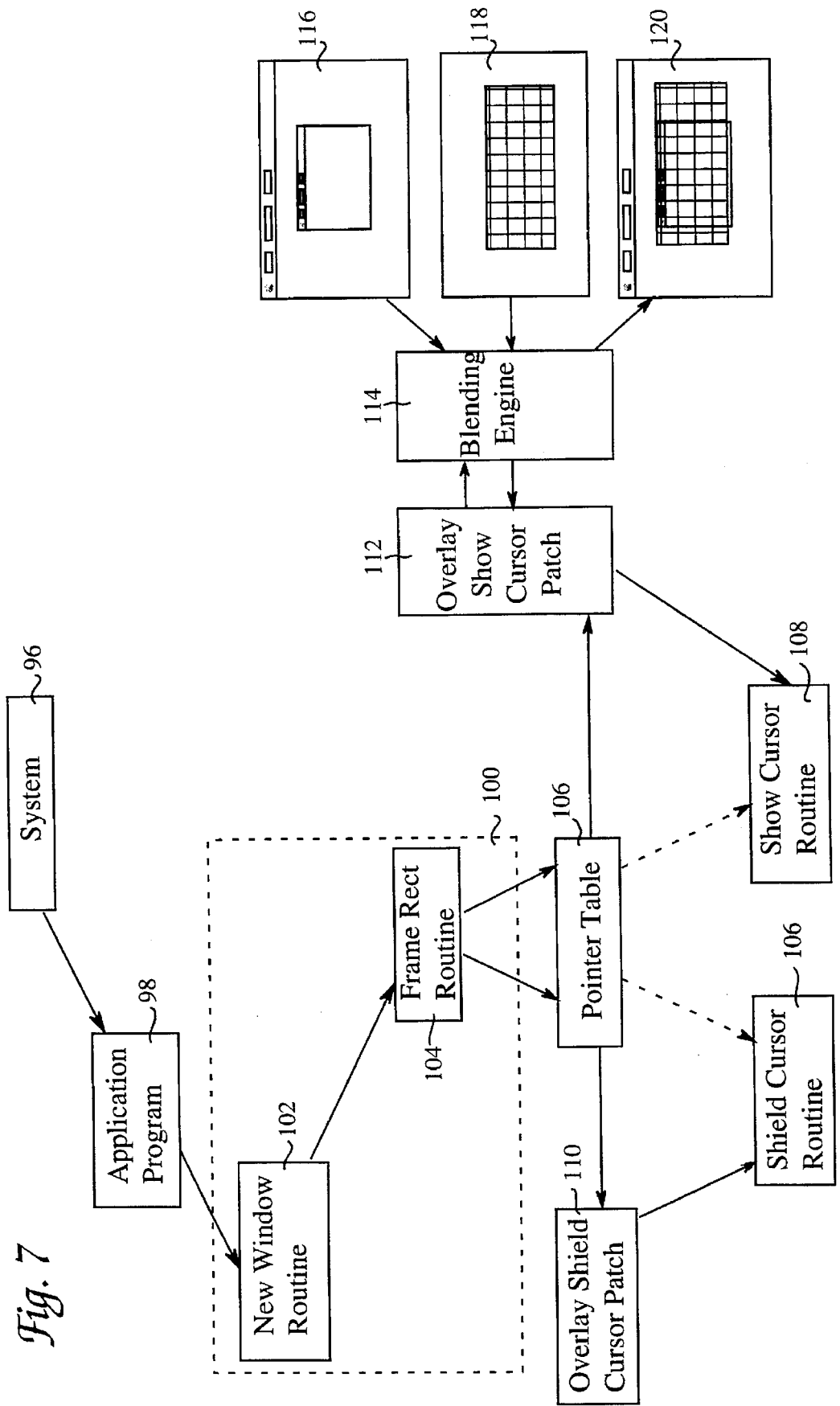

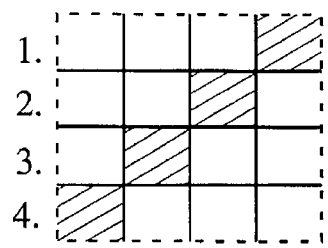
*Fig. 10a*
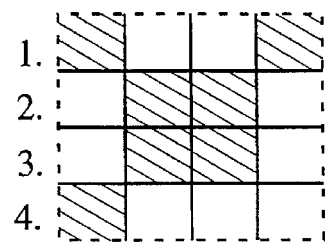
*Fig. 10b*
*Fig. 10c*
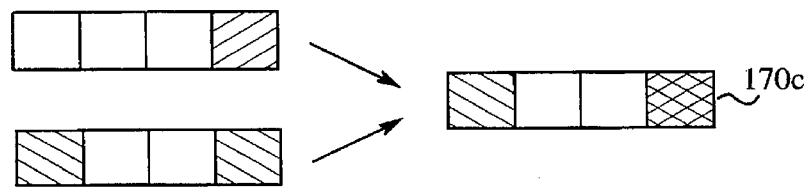
*Fig. 10d*
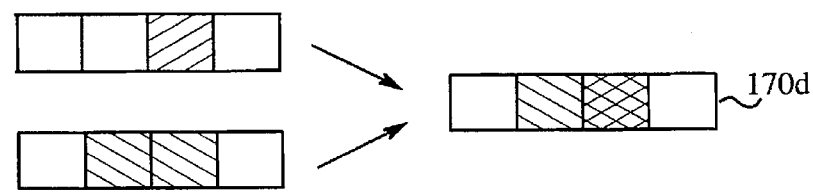
*Fig. 10e*
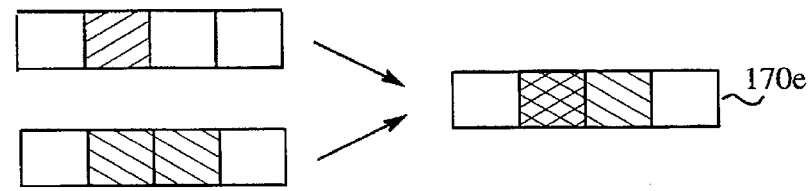
*Fig. 10f*
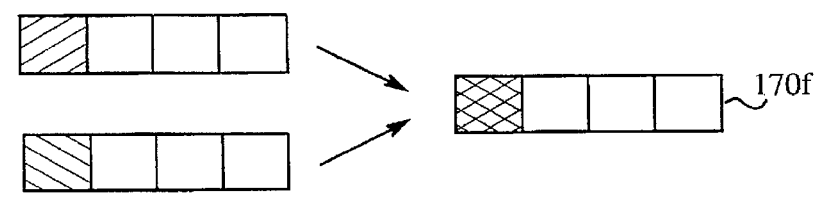

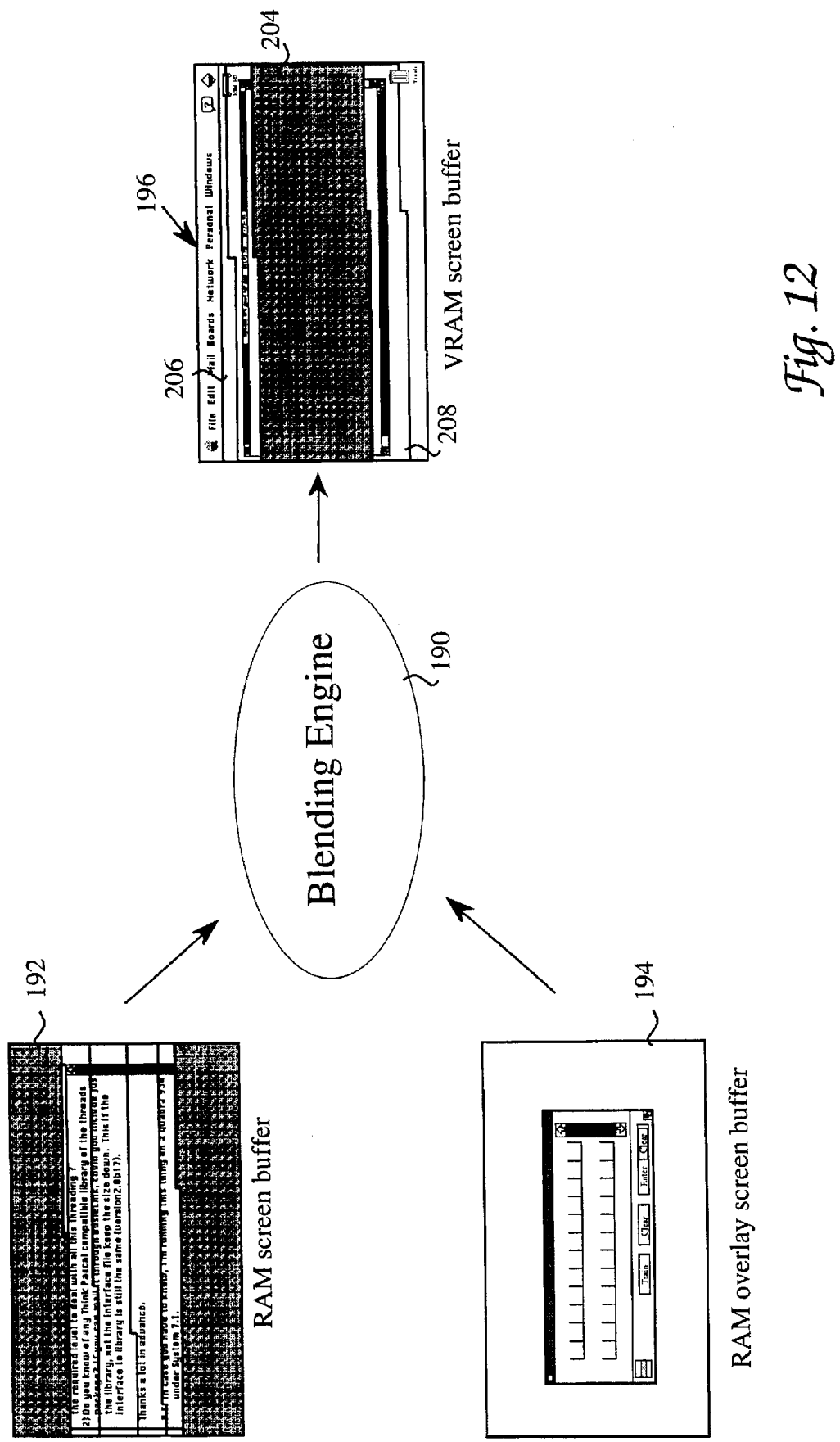

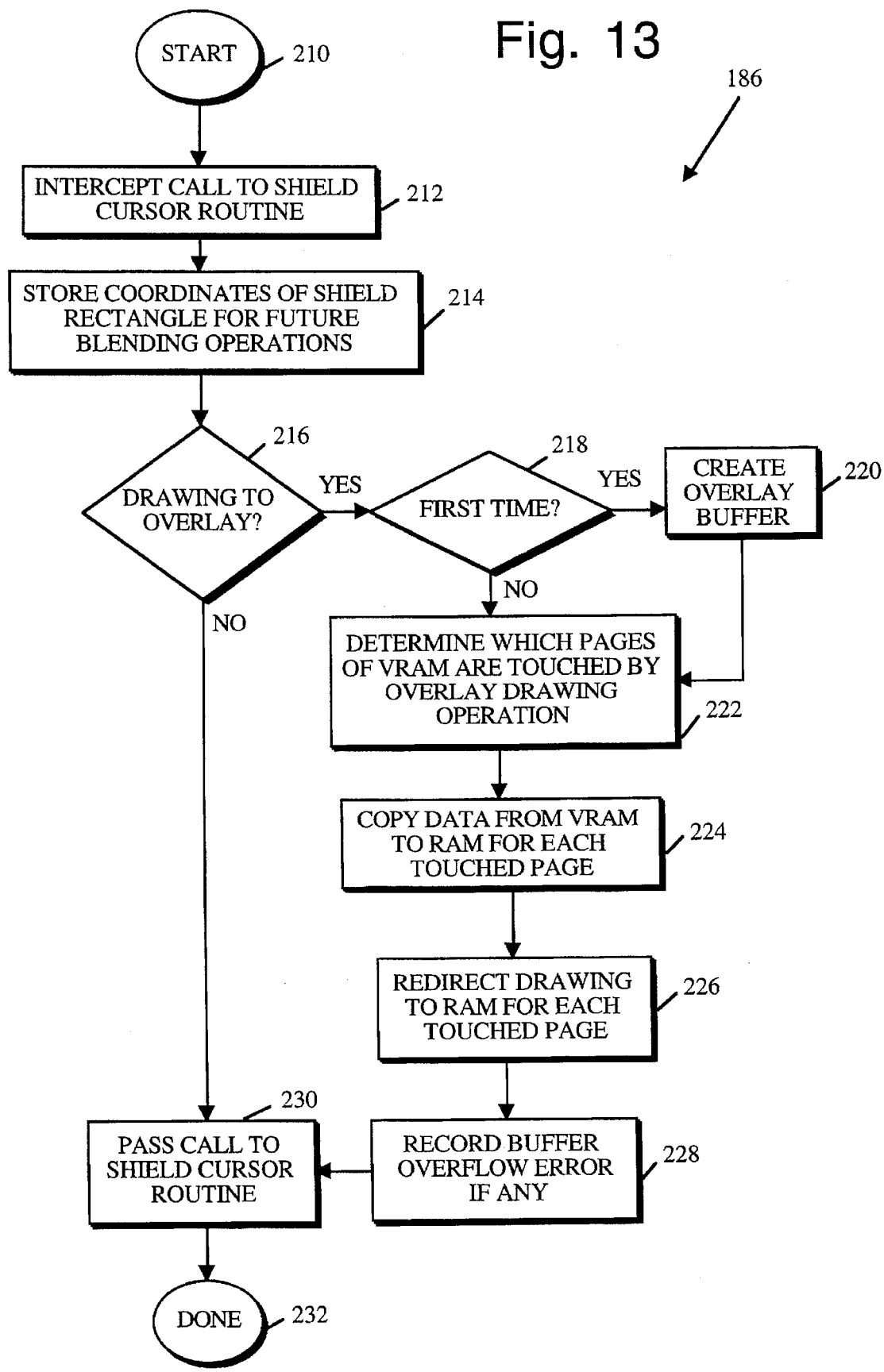

MMU Data Structures (Macintosh Computer System)

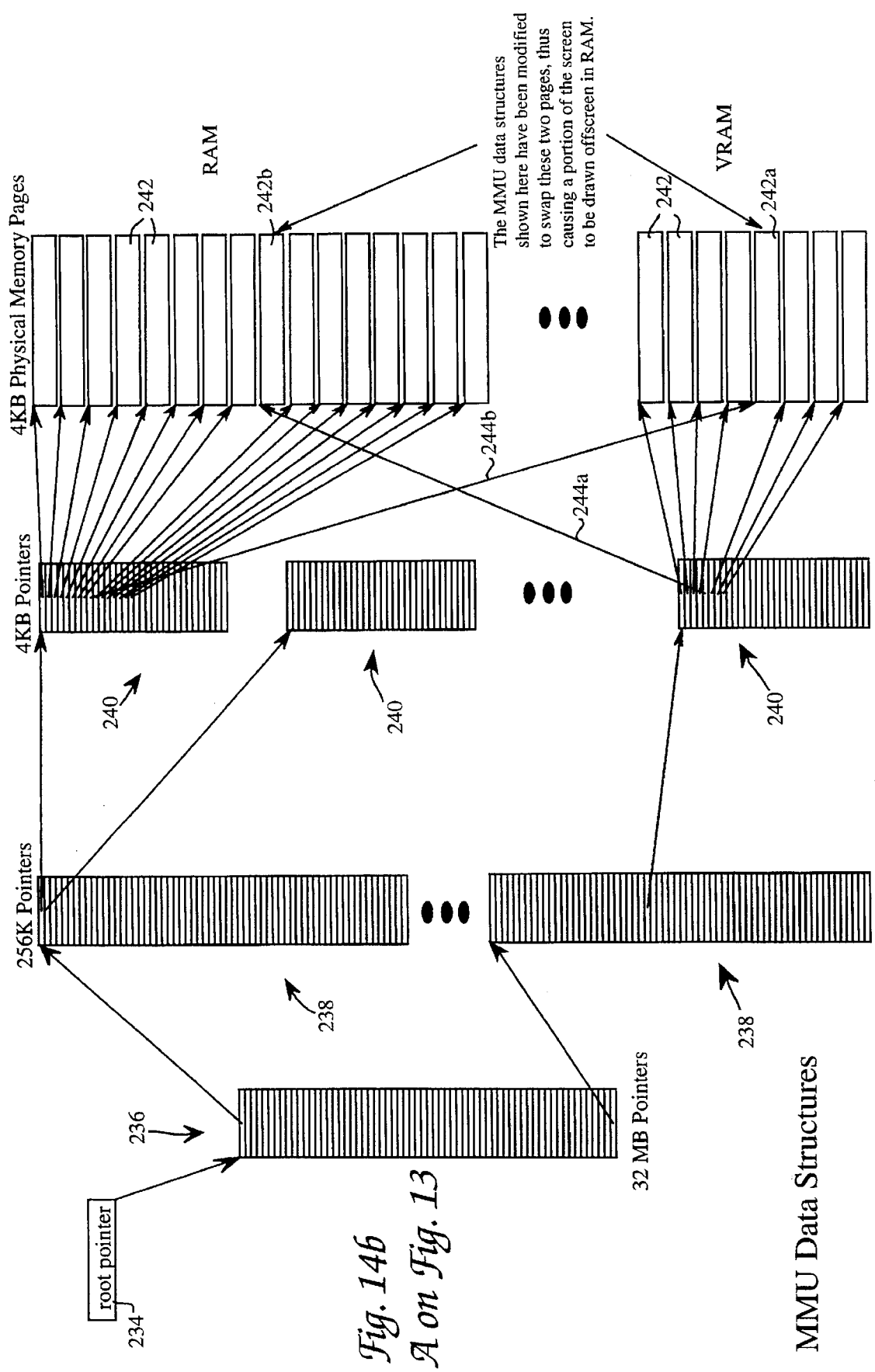

METHOD AND APPARATUS FOR DISPLAYING AN OVERLAY IMAGE

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware computer system, hereinafter generically referred to as a "pen computer system", "pen computer", or the like. A pen-based computer system is typically a small, hand-held computer where the primary method for inputting data includes a "pen" or stylus. A pen-aware computer system is one which has been modified to accept pen inputs in addition to traditional input methods.

A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

Typically, graphical images can be input into the pen computer systems by merely moving the stylus across the surface of the screen, i.e. making a "stroke" on the screen. A stroke is defined as the engagement of the screen with a stylus, the movement of the stylus across the screen (if any), and its subsequent disengagement from the screen. As the CPU senses the position and movement of the stylus, it can generate a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Methods for recognizing the meaning of "ink" are well known to those skilled in the art.

Pen computer systems, tend to discourage the use of a keyboard as an input device. Most of the software written for pen computers is designed to function well with pen strokes and by "tapping" the stylus against the computer screen in defined areas. A "tap" is a stroke which does not move substantially on the screen. In addition, a primary feature of many pen computer systems is their portability, which a keyboard, if included with the pen system, would seriously degrade.

In some instances, however, the need arises on a pen-based computer for data entry in a keyboard-like fashion. For example, the pen-based computer might be running a non-pen aware program that normally accepts characters from a keyboard. Also, in some cases, the only way to enter data efficiently might be to use a keyboard-like input device.

In particular, a need might arise on a pen computer to enter a command or character that is normally or most efficiently executed with keystrokes on a keyboard-based system. In some pen computer systems, such keyboard-like entry of commands can be accomplished using a keyboard image displayed on the screen of the pen computer. The keyboard image resembles a standard keyboard, and keys are selected using a stylus. Most keyboard commands and characters can be entered in this fashion. Another alternative is to provide a recognition window for inputting handwritten data which is then recognized and sent to an application program as if it were typed from a keyboard. A problem with all such input approaches is that they occupy valuable screen space, which is often very limited on pen computer systems.

SUMMARY OF THE INVENTION

The present invention provides a transparent overlay image over a base image provided on a screen of a pen computer system. The overlay image can serve as an input device for application programs without obscuring images made on the screen by the application programs. The provision of the transparent overlay image of the present invention makes it possible to use much or all of the screen of the pen computer system for input. It also advantageously allows controls in the overlay image to be formed proximate to specific elements of application images beneath it.

A method for providing an overlay image on the screen of a computer system in accordance with the present invention includes the steps of: 1) Displaying a base image on the screen of the computer system; and 2) displaying an overlay image on the screen such that overlapped portions of the application image can be seen through the overlay image. Preferably, the base image is produced by an unmodified application program running on the computer system, and the overlay image is produced by a computer implemented process of the present invention referred to herein as the "overlay utility".

A method for displaying images on a screen of a pen computer system in accordance with the present invention includes the steps of: 1) running an application program on a central processing unit (CPU) of a pen computer system to produce a base image on a screen coupled to the CPU; and 2) running an overlay program on the CPU to produce an overlay image on the screen such that portions of the base image which are overlapped by the overlay image are at least partially visible through the overlay image. Preferably, the step of running the overlay program includes the steps of: 1) displaying an overlay image on the screen; 2) intercepting screen inputs which contact the overlay image; 3) processing the intercepted screen inputs in the CPU; and 4) updating the application program based upon the process screen inputs. The step of displaying an overlay image preferably involves the blending of an overlay image with the base image. In one embodiment of the present invention, the blending is accomplished within the CPU, and in another embodiment of the present invention, the blending is accomplished externally to the CPU in specialized video driver circuitry.

A pen computer system in accordance with the present invention includes a central processing unit (CPU), a screen assembly coupled to the CPU, a mechanism coupled to the screen assembly for displaying a base image on the screen assembly, and a mechanism coupled to the screen assembly for displaying an overlay image on the screen assembly such that portions of the base image which are overlapped by the overlay image are at least partially visible through the overlay image. Preferably, the screen assembly includes an LCD matrix display provided with a stylus-sensitive tablet. A stylus is used with the tablet of the screen assembly to enter data into the CPU.

In the pen computer system of the present invention, the mechanism for displaying the base image preferably includes a first computer implemented process running on the CPU to produce first video data, and video driver circuitry coupled between the CPU and the screen assembly which is receptive to the first video data. Also preferably, the mechanism for displaying the overlay image includes a second computer implemented process running on the CPU producing second video data, wherein the video driver circuitry is also receptive to the second video data. The pen computer system blends the first video data and the second video data to produce a blended image on the screen assembly. In one embodiment of the present invention, the blending is part of the second computer implemented process running on the CPU. In another embodiment of the present invention, the blending is accomplished within the hardware of the video driver circuitry.

An advantage of the present invention is that a translucent overlay can be provided which permits a user to input data into an active application program without obscuring the user's view of the program's display window. The overlay image of the present invention is therefore well suited for computer systems having limited display areas, such as the aforementioned pen computer systems.

Another advantage of the overlay image of the present invention is that it works with both pen-aware and non-pen-aware application programs. Therefore, the overlay image of the present invention can be used with the many thousands of application programs which are not designed to be used in pen computer systems.

These and other advantages of the present invention will become apparent upon reading the following detailed descriptions and studying the various figures of the drawings.

BRIEF DESCRIPTION OF THE DRAWINGS

FIG. 7 is a diagram illustrating the "Display an Overlay Image" step 90 of FIG. 6B;

FIGS. 10a–10f illustrate a computer-implemented blending process;

FIG. 12 illustrates the operation of the "Blending Engine" 190 of FIG. 11;

FIG. 13 is a flow diagram illustrating the "Overlay Shield Cursor Patch" 186 of FIG. 11;

FIG. 14b illustrates a modification to the MMU data structures used to implement the "Redirect Drawing to RAM" step 226 of FIG. 13;

DETAILED DESCRIPTION OF THE PREFERRED EMBODIMENTS

The present invention is well suited for pointer based computer systems such as the pen-based, pen-aware and mouse-based systems that are currently popular. For the purposes of illustration, the invention will be described in connection with a pen-based or pen-aware ("pen") system.

Figure 1:
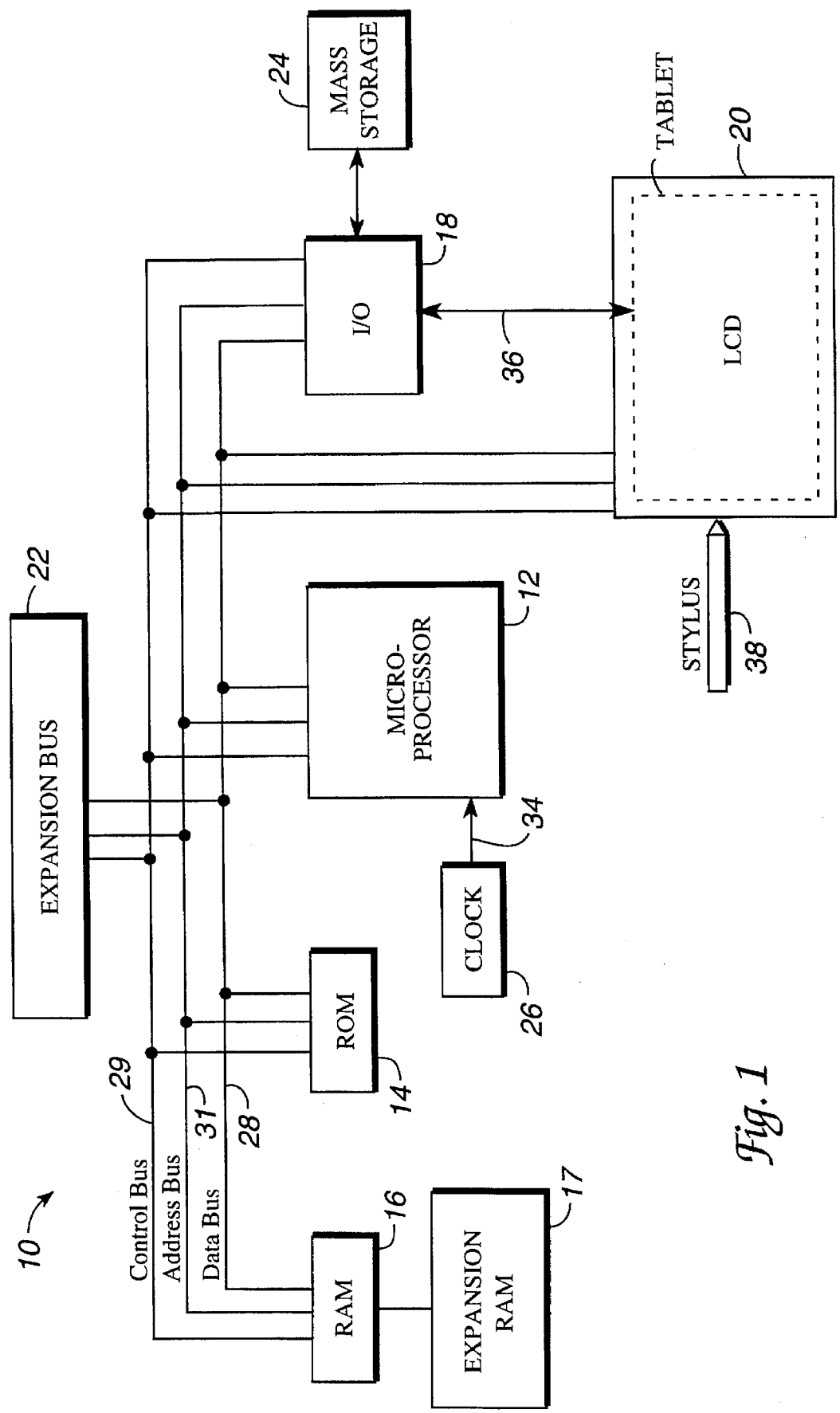
FIG. 1 is a block diagram of a pen computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 can be a liquid crystal display (LCD) of the type commercially available from a variety of manufacturers. The input device ("tablet") of display assembly 20 can be a thin, clear membrane which covers the LCD display and which is sensitive to the position of a stylus 38 on its surface. Alternatively, the tablet can be an embedded RF digitizer activated by an "active" RF stylus. Combination display assemblies are available from a variety of vendors.

Other types of user inputs can also be used in conjunction with the present invention. While the method of the present invention is described in the context of a pen system, other pointing devices such as a computer mouse, a track ball, or a tablet can be used to manipulate a pointer on a screen of a general purpose computer. Therefore, as used herein, the terms "pointer", "pointing device", "pointer inputs" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 can be provided with a backup battery to prevent the loss of data even when the pen computer system 10 is turned off. However, it is generally desirable to have some type of long term storage 24 such as a commercially available miniature hard disk drive, non-volatile memory such as flash memory, battery backed RAM, PC-data cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 2:
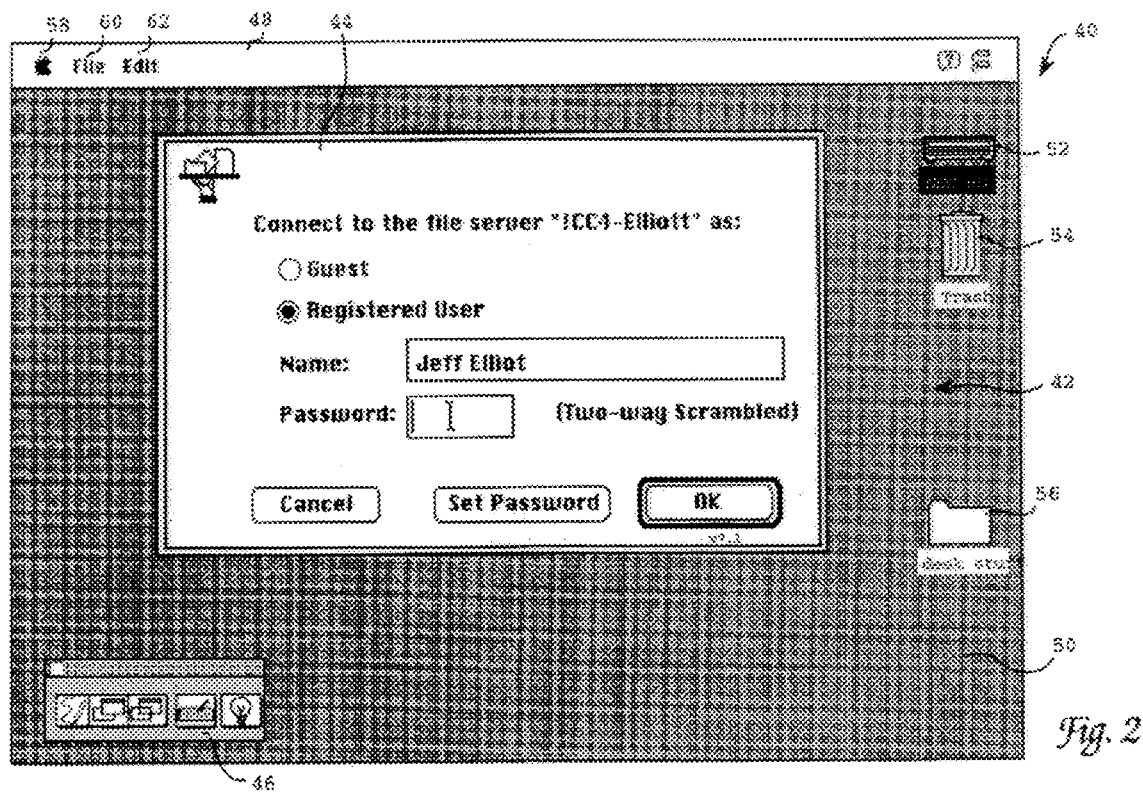
FIG. 2 is a view of a Macintosh computer screen showing a desktop, a window produced by an application program called "AppleShare" and a utility program known as "Pen-Board"

In FIG. 2, a screen 40 of a Macintosh computer system made by Apple Computer, Inc., of Cupertino, Calif., includes a desktop image 42 produced by a Macintosh operating system, a window 44 produced by a "AppleShare" application program made by Apple Computer, Inc., and a palette 46 produced by a small application program or "utility" known as "PenBoard" made by Apple Computer, Inc. The desktop 42, which includes a menu bar 48 and a desk area 50, often displays a number of icons 52, 54 and 56, which represent different objects or functions. For example, the icon 52 represents a hard disk drive; icon 54 represents the "trash can" in which files can be deleted; and icon 56 represents a folder which can contain applications and documents of various types. The menu bar 48 preferably includes a number of labels 58, 60, and 62 for pull-down menus, as is well known to Macintosh users.

As mentioned previously, the desk top 42 is created by the operating system (sometimes referred to as the "Finder"). The Finder can be considered to be a specialized form of application program which displays an image on the entirety of the screen 40. In other words, the "window" size of the desk top 42 is the same size as the screen 40. The application program AppleShare which creates the window 44 typically does not take over the entire screen 40. Similarly, the palette 46 (which is just a specialized form of window) is produced by the PenBoard application, and does not occupy the entire space of the screen 40.

As is apparent by studying FIG. 2, the screen 40 can quickly become occupied with icons, windows and palettes. This is not a major problem in traditional computer systems wherein the primary forms of input comprise keyboards and pointer devices, such a mice. However, in the pen computer systems where these more traditional forms of input devices are not always available, the limitations of screen size becomes readily apparent.

Figure 3:
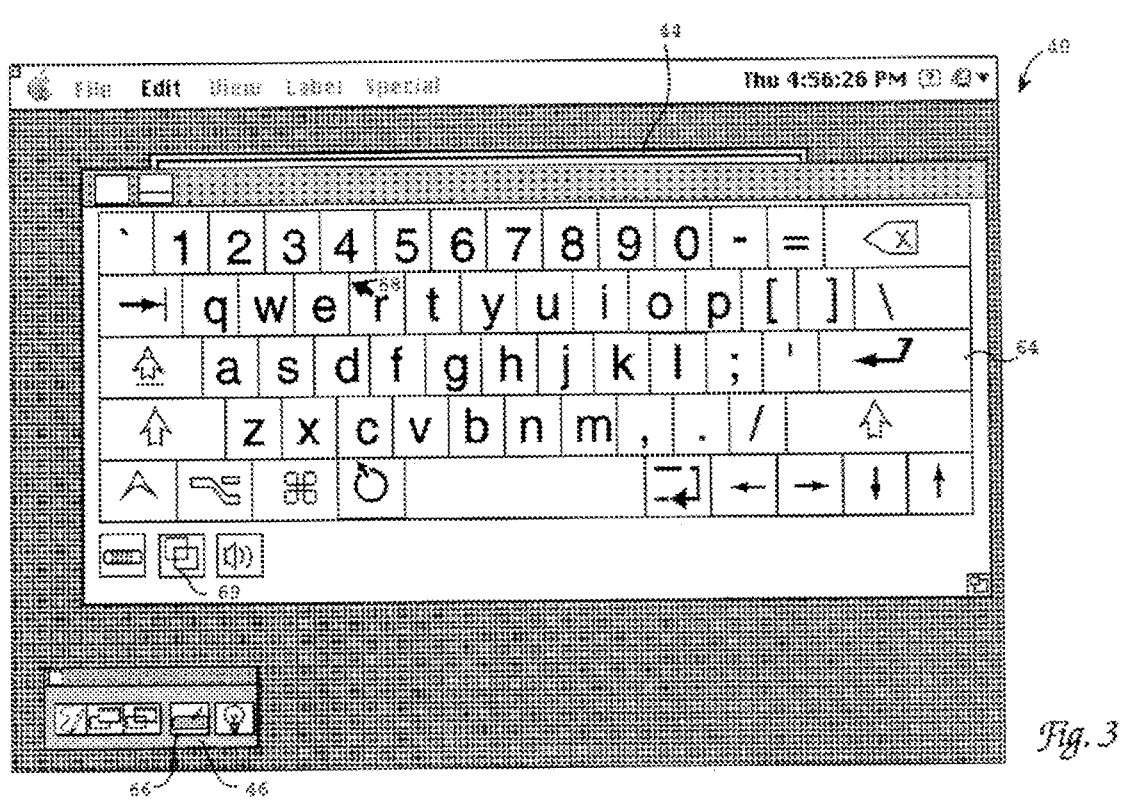
FIG. 3 illustrates a non-transparent overlay which mostly obscures the desktop and window of the AppleShare application program.

In FIG. 3, a keyboard image 64 has been provided on screen 40 to aid in the input of data to the AppleShare application program described previously. Preferably, this keyboard image 64 is provided by dragging a keyboard icon 66 off of the PenBoard palette 46 in a fashion more fully described in copending U.S. patent application Ser. No. 08/060,458, filed May 10, 1993, on behalf of Gough et al., entitled "Method and Apparatus for Interfacing With a Computer System", and assigned to the assignee of the present application, the disclosure of which is hereby incorporated herein by reference in its entirety. As can be seen in this FIG. 3, the keyboard image 64 completely obscures the icons 52, 54 and 56 of FIG. 2, and almost totally obscures the window 44 of the AppleShare application program. Information can be entered into the window 44 of the application program from the keyboard image 64 by "tapping" on a "key" with the stylus 38. For example, arrow 68 on the keyboard image 64 represents the "tapping" on the key "R" with the stylus 38. This tapping action will send a "R" to be displayed in the window 44 of the AppleShare application just as if a "R" had been typed on a physical keyboard. Again, the functioning of the keyboard image 64 is discussed in the aforementioned copending U.S. patent application of Gough et al.

While the keyboard image 64 can be used to input data into a currently active application program (such as AppleShare), the keyboard image prevents any user feedback of the information being entered into application windows obscured by the keyboard image. Therefore, it is difficult for the user to determine whether data has been properly entered into the application program. This, in turn, slows down the data entry process, and greatly increases the chances for errors.

Figure 4:
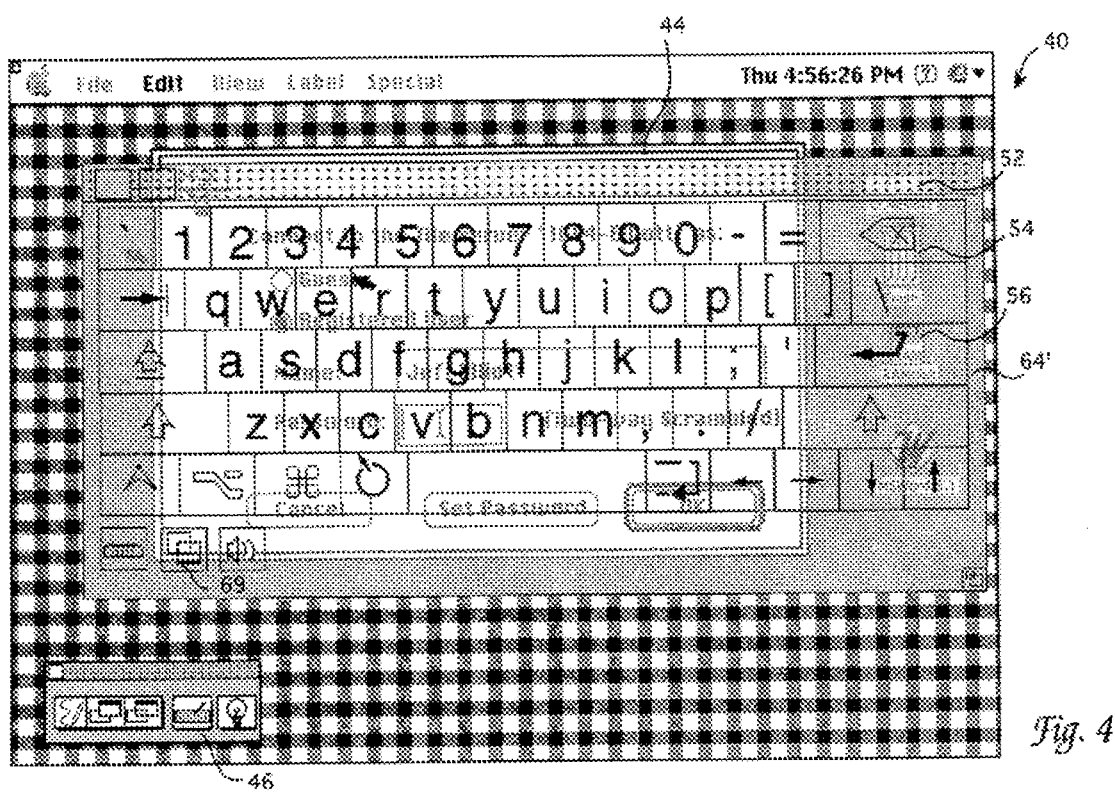
FIG. 4 illustrates the overlay keyboard after it has been made transparent by the method and apparatus of the present invention.

The present invention solves this problem, as illustrated in FIG. 4. A user taps on a "transparency" icon 68 on the keyboard image 64 of FIG. 3 with the stylus 38 to cause the keyboard 64 to become partially transparent or "translucent." By "translucent" it is meant herein that the overlay image can be seen, but it can also be seen through. Tapping on the transparency icon 68 of the keyboard image 64' of FIG. 4 would cause the "solid" keyboard image 64 of FIG. 3 to reappear.

As can be seen, the translucent keyboard image 64' allows the window 44 and icons 52, 54, and 56, to be seen through the translucent keyboard image 64'. In other words, portions of base images which are overlapped by the keyboard image 64', can still be seen (with some loss in resolution) through the translucent keyboard image 64'.

Figure 5A:
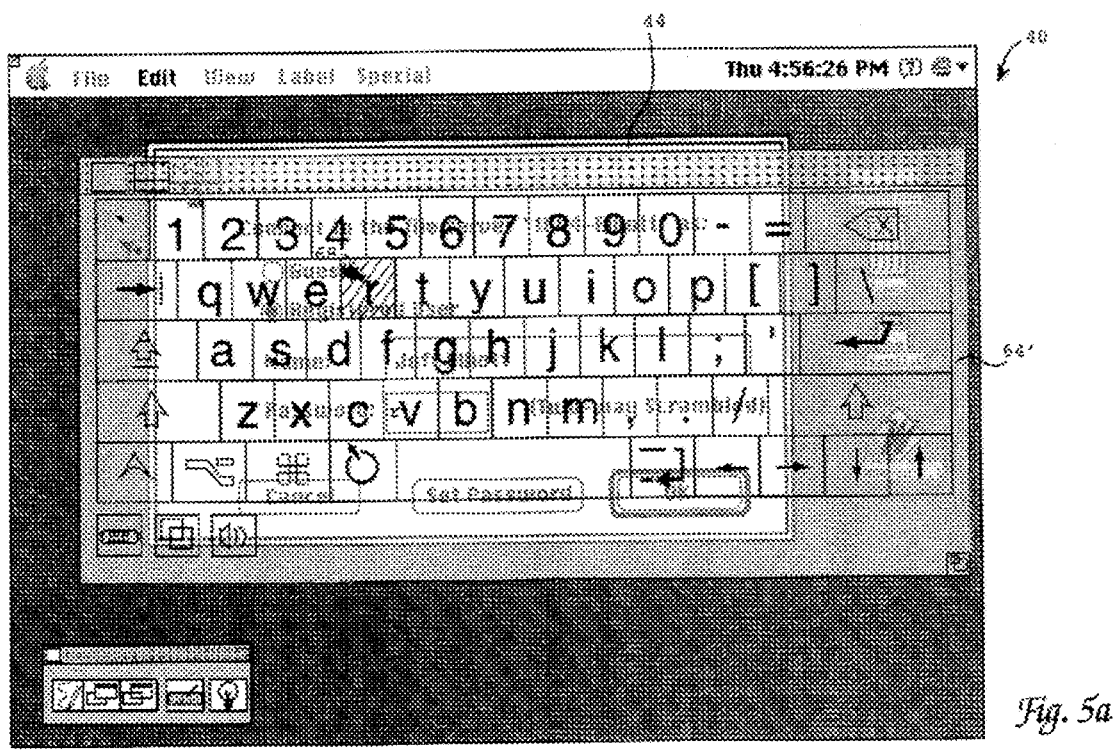
FIGS. 5a–5c illustrate the entry of data to the active window of the AppleShare program.
Figure 5B:
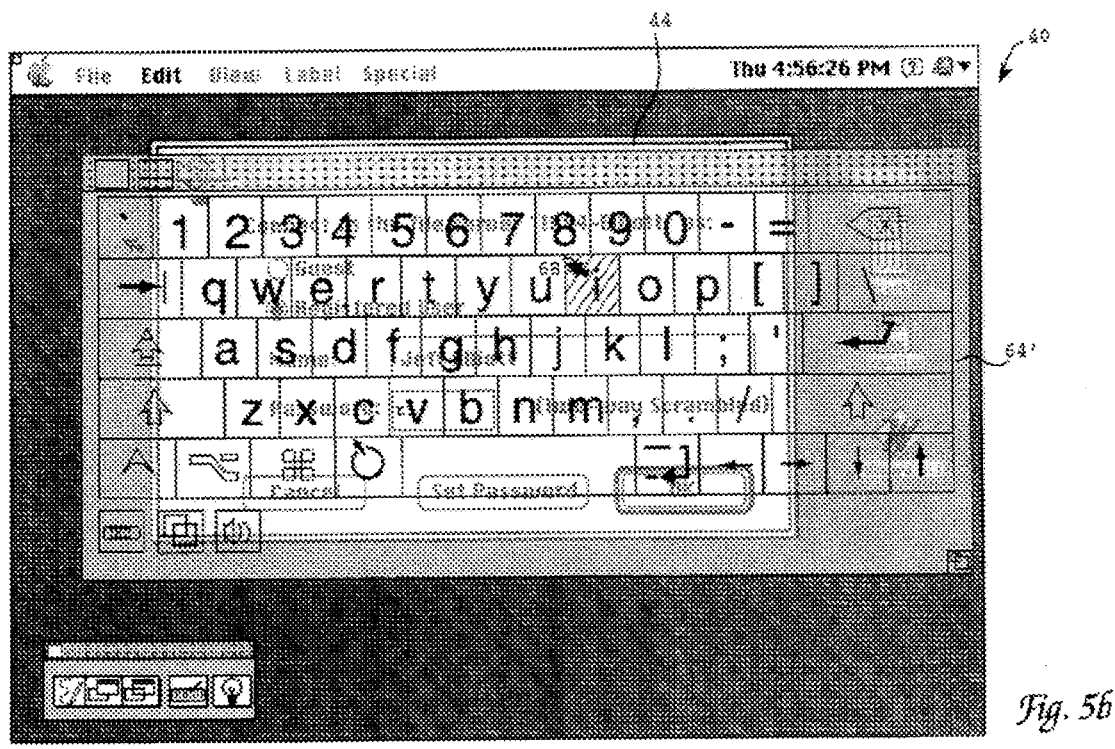
Figure 5C:
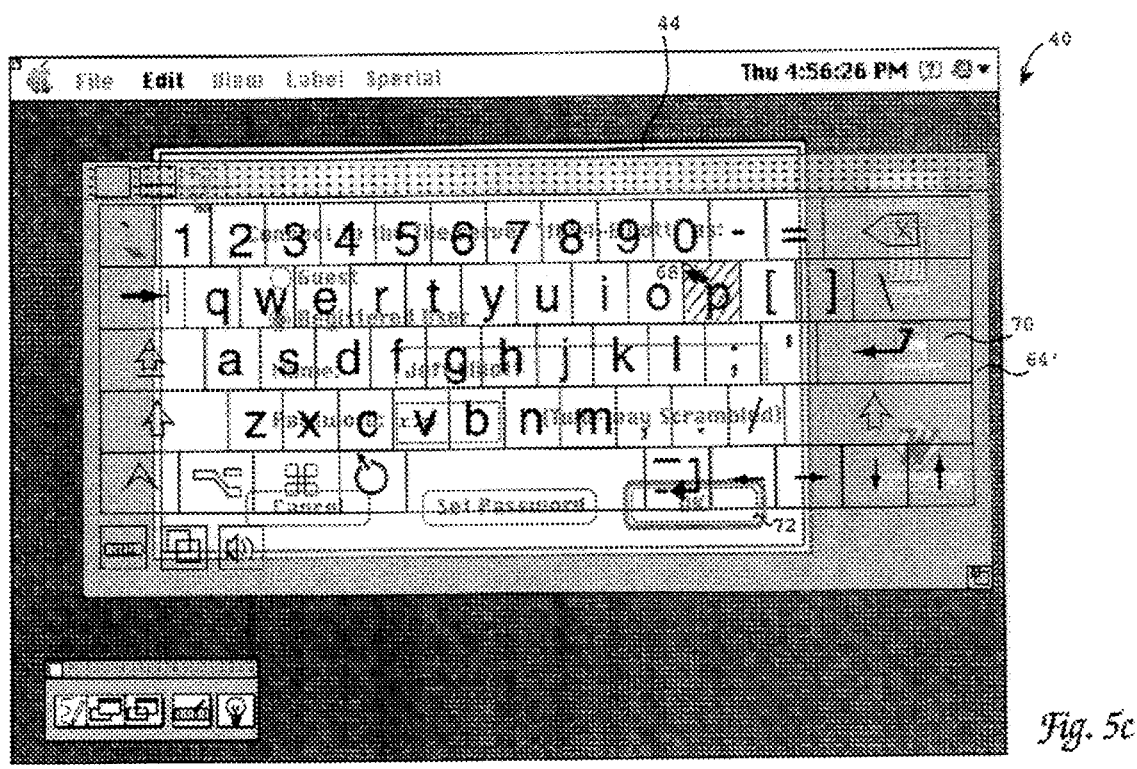

The functioning of the keyboard image 64' will be explained in greater detail with reference to FIGS. 5a–5c. In FIG. 5a, the stylus 38 is used to "tap" on the "r" key as indicated by the arrow 68 and the shading of the "r" key. The keyboard image 64' "intercepts" the tap 68 which would otherwise fall on the window 44, and, instead causes a "r" to be sent to the AppleShare program and be displayed in a password field of the window 44. (Actually, AppleShare would display a "bullet" instead of the "r" to maintain the security of the password, but it will be assumed in this example that the typed password will remain visible). The "r" within the password field of window 44 can be seen through the translucent window 64' in this figure. In FIG. 5b, second tap 68 on the "i" key will cause the keyboard image 64' to "intercept" the tap which would otherwise fall on the window 44, and to send a "i" character to the AppleShare application program which then displays an "i" after the "r" in the password field of window 44. Next, as seen in FIG. 5c, the "p" key is tapped at 68, causing the keyboard 64' to intercept the tap which would otherwise fall on the window 4 and to send the "p" character to the AppleShare program which displays the character in the password field after the character "r" and "i." Other characters and control characters (such as the "return" button 70) can be sent to the application program controlling window 44 in a similar fashion.

It will be apparent with a study of FIGS. 4 and 5a–5c that the translucent keyboard image 64' is a distinctly superior user interface for situations in which screen area is at a premium. Since images "beneath" the translucent keyboard image 64' can be seen through the keyboard image, the user has immediate feedback as to the accuracy of his or her input to the active application program. For example, if a key were "tapped" in error, the backspace key 72 can be tapped on the translucent keyboard 64' so that the correct character can be reentered. The translucent keyboard 64' therefore effectively expands the useful area of screen 40 by providing multiple, usable, overlapped images.

Figure 6A:
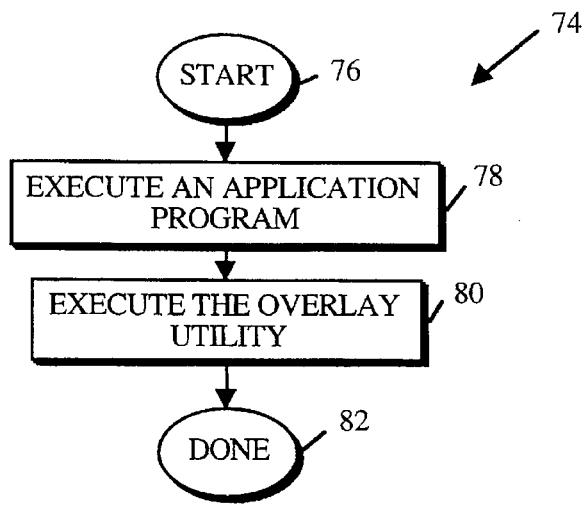
FIG. 6a is a flow diagram illustrating the loading of an application program and the overlay utility of the present invention.

In FIG. 6A, a process 74 in accordance with the present invention for implementing a translucent overlay image begins at 76. Next, in a step 78, an application program is started or "executed" on the computer system 10. In the previous example, the application program was the AppleShare application program which produced the window 44 on screen 40. Next, in a step 80, the "overlay utility" is started or "executed" on the computer system 10. This "overlay utility" is an application program (often referred to as a "utility" or "routine") which implements the computer implemented process of the present invention. In the previous example, this step 80 is initiated by tapping on the "button" 69 of the keyboard image 64 (see FIG. 3). The process is then completed as indicated at 82.

Figure 6B:
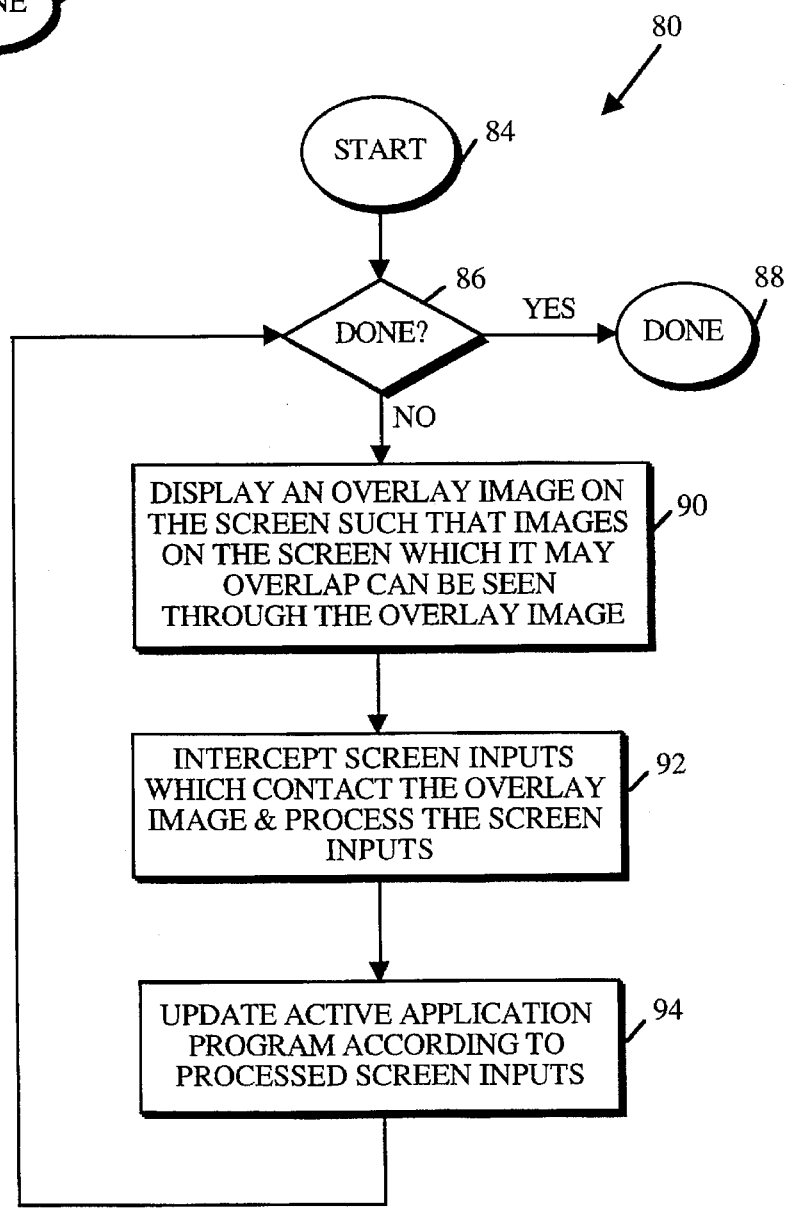
FIG. 6b is a flow diagram illustrating the "Execute the Overlay Utility" step 80 of FIG. 6A in greater detail.

In FIG. 6B, the process 80 of FIG. 6A is illustrated in greater detail. The process 80 begins at 84, and in a step 86, it is determined whether the process 80 is completed. In this instance, a process 80 is completed when the "button" 69 of the translucent keyboard image 64' (see FIG. 4) is tapped. If the process is completed, the overlay utility 80 is terminated as indicated at 88. If the process is not completed, a step 90 displays an "overlay" image on the screen such that images on the screen that it overlaps can be seen through the overlay image. In the current example, the overlay image is the translucent image 64' and the images on the screen include the window 44 and icons 52–56 and other parts of the desktop 42. Of course, other overlay images besides keyboards can be provided by the present invention, e.g. handwriting "recognition" windows, etc. Next, in a step 92, the overlay utility intercepts screen inputs which contact the overlay image, and these screen inputs are processed. In the current example, the intercepted screen inputs are "taps" on the "r", "i", and "p" keys of the translucent keyboard image 64'. Finally, in a step 94, the active application program which is executing in step 78 of FIG. 6A, is updated according to the processed screen inputs. In this example, this updating involves the receiving of the "r", "i", and "p" characters by the application program and the display of these characters in the password field of window 44. Process control is then turned over to step 86 which again determines whether the process 80 is completed.

A preferred method in accordance with the present invention for implementing the process 80 on a Macintosh computer system is illustrated with reference to FIG. 7. The illustrated method of FIG. 7 is fairly specific to the Macintosh computer system. It will therefore be apparent to those skilled in the art that when the process 80 is implemented on other computer systems, such as MS-DOS compatible computer systems and UNIX computer systems, that the methodology of FIG. 7 will have to be modified. However, such modifications will become readily apparent to those skilled in the art after studying the following descriptions of how the process 80 is implemented on the Macintosh computer system.

In FIG. 7, the operating system, application program, overlay utility, system routines, etc., are shown in a somewhat hierarchical fashion. At the highest level is the operating system 96 of the computer system 10 of FIG. 1. Running under the operating system 96 is an application program 98, such as the aforementioned AppleShare application program. Application program 98, when it wants to open a window such as window 44 of FIG. 2, calls a set of routines 100 provided by the operating system 96. More specifically, in the Macintosh operating system, application program 98 calls a "New Window" routine 102 which, in turn, calls a "Frame Rect" routine 104. The Frame Rect routine uses a pointer table 106 to call a "Shield Cursor" routine 106 and a "Show Cursor" routine 108. If the application program 98 were running on system 96 without the process 80 of the present invention, this would be the entirety of the calls to open up the window 44 of FIG. 2. This process is extensively documented in the multi-volume reference set, *Inside Macintosh*, by C. Rose et al., Addison-Wesley Publishing Company, Inc., July 1988 and are well known to those skilled in the art of programming on the Macintosh operating system.

The implementation of computer implemented process 80 modifies this normal flow of routine calls in the following way. When the application program 98 calls the New Window routine 102 which calls the Frame Rect routine 104, which attempts to call the Shield Cursor Routine, the Frame Rect routine 104 instead calls a portion of the process of step 90 of FIG. 6B known as the Overlay Shield Cursor Patch 110. This is accomplished by having the process 90 modify the pointer table 106 such that when the Frame Rect routine 104 is trying to call the Shield Cursor Routine 106 it, instead, calls the Overlay Shield Cursor Patch 110. After the Overlay Shield Cursor Patch 110 completes its process, the Shield Cursor Routine 106 is then called. As far as the Frame Rect routine 104 is concerned, it does not know of the diversion of process control to the Overlay Shield Cursor Patch process 110, and instead believes that it directly called the Shield Cursor Routine 106.

The process step 90 of FIG. 6B similarly "tricks" the Frame Rect routine 104 when it attempts to call the Show Cursor Routine 108. In that instance, when the Frame Rect routine 104 goes to the pointer table 106 in an attempt to call the Show Cursor Routine 108, process control is instead diverted to a process 112 known as "Overlay Show Cursor Patch". The Overlay Show Cursor Patch process 112 interacts with a Blending Engine process 114 to blend a first screen image 116 generated by the Macintosh operating system and the application program, with a second image 118 (in this case, the keyboard image) to form the blended image 120. The operation of the Blending Engine will be discussed in greater detail subsequently. After the completion of the blending process of 114, the Overlay Show Cursor Patch process 112 turns over process control to the "Show Cursor Routine" process 108. Again, as far as the Frame Rect routine 104 is concerned, it made a direct call to the "Show Cursor Routine" 108 and was ignorant of the diversion of the process control to the Overlay Show Cursor Patch 112 and the Blending Engine 114.

Figure 8:
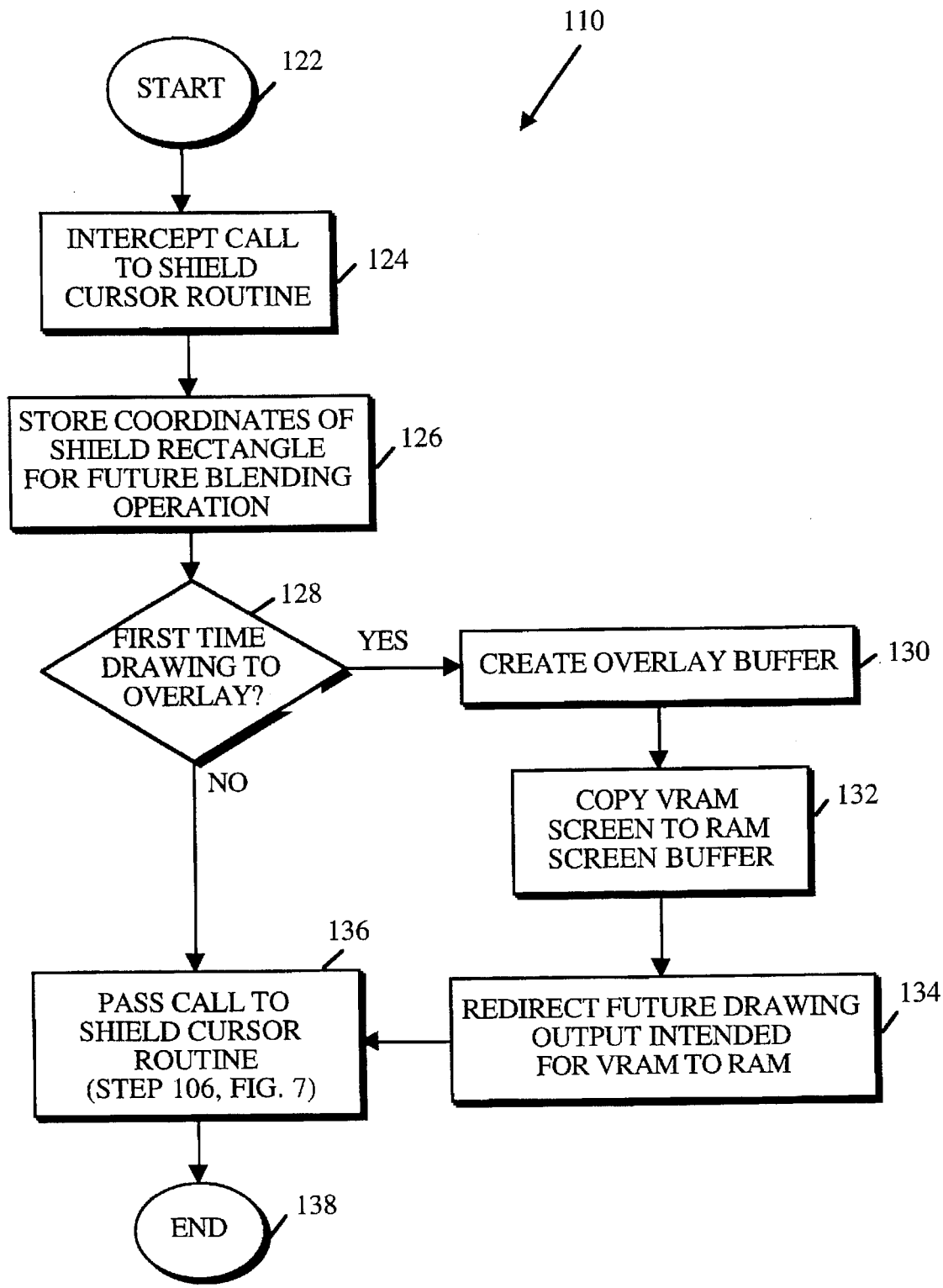
FIG. 8 is a flow diagram illustrating the "Overlay Shield Cursor Patch" step 110 of FIG. 7.

FIG. 8 illustrates the "Overlay Shield Cursor Patch" process 110 of FIG. 7 in greater detail. The process 110 begins at 122 and, in a first step 124 the call from the Frame Rect routine 104 to the Shield Cursor Routine 106 (see FIG. 7) is intercepted. This is accomplished by modifying the pointer table 106 such that the process control jumps to the Overlay Shield Cursor Patch address area rather than the Shield Cursor Routine area 106 upon a call from the Frame Rect routine 104. The Overlay Shield Cursor Patch routine 110 must, however, remember the proper address for the Shield Cursor Routine so that the process control can be passed to the Shield Cursor Routine 106 at the appropriate time. Next, in a step 126, the coordinates of the shield rectangle is stored for future blending operations. The shield rectangle is essentially the rectangle of the window to be developed by the application program, such as the window 44. The coordinates of the shield rectangle can therefore be fully described with two corner coordinates, as is well known to those skilled in the art of programming on the Macintosh computer system. Next, in a step 128, it is determined whether this is the first time that the application program 98 is drawing to the screen 40 after an overlay image has been produced. If it is, a step 130 creates an overlay buffer, and the image of the screen 116 that is stored in the video RAM (VRAM) is copied from the system's VRAM to a RAM screen buffer provided in general system RAM. Next, in a step 134, the system is set such that future drawing output which is intended, by the operating system, to go to VRAM is sent to the RAM screen buffer of the present invention instead. Finally, the call made by the Frame Rect routine 104 is finally passed to the Shield Cursor Routine 106 in a step 136, and the process is completed as indicated at 138.

Figure 9:
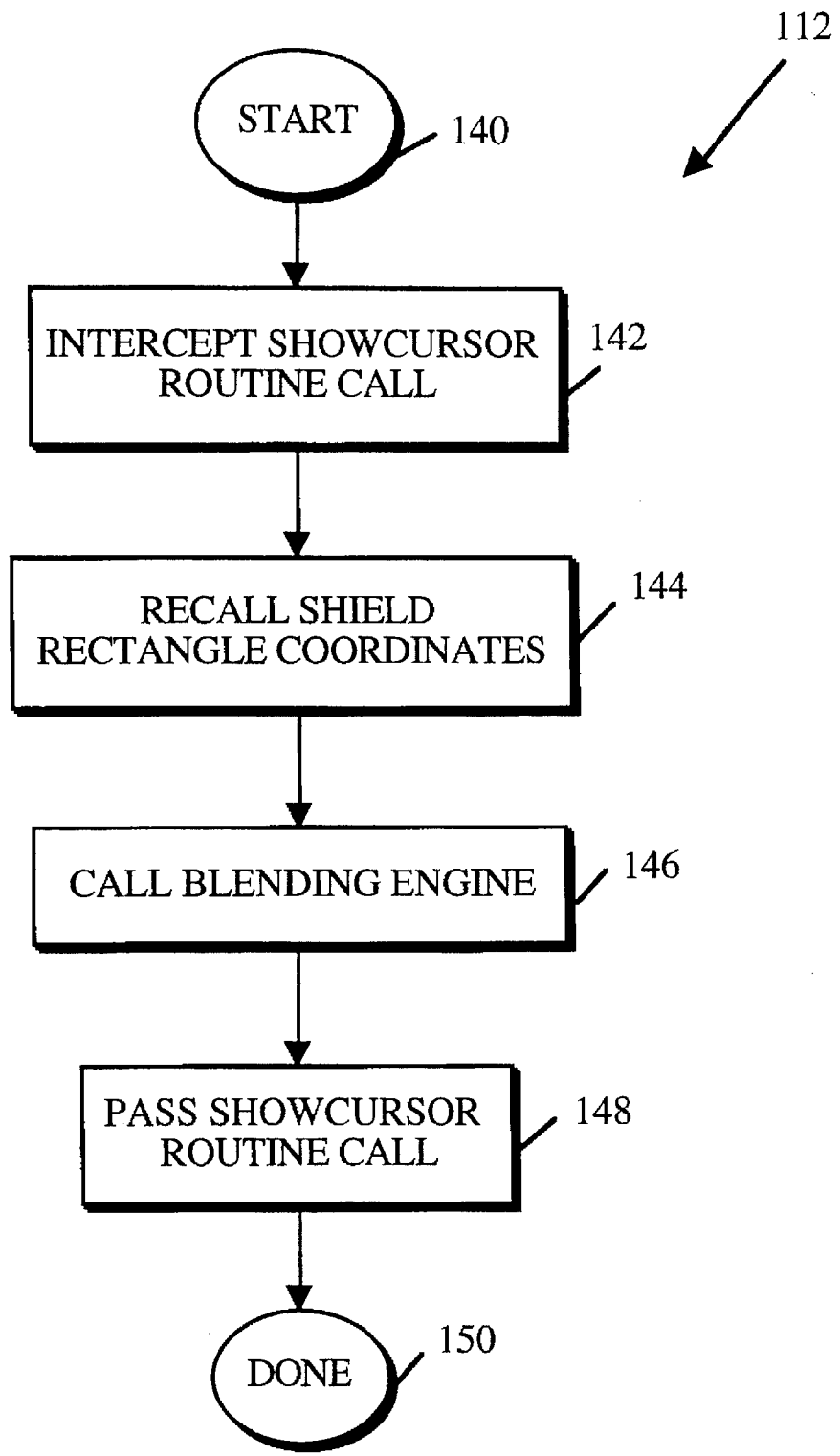
FIG. 9 is a flow diagram illustrating the "Overlay Show Cursor Patch" step 112 of FIG. 7.

In FIG. 9, the process 112 of FIG. 7 is described in greater detail. The process 112 begins at 140 and, in a step 142, the Show Cursor Routine call made by the Frame Rect routine 104 is intercepted. This step 142 is, again, preferably implemented by modifying the pointer table to cause process control to jump to the Overlay Show Cursor Patch 112 instead of the Show Cursor Routine 108. The starting address of the Show Cursor Routine 108 is stored by the Overlay Show Cursor Patch 112 for later use. Next, in a step 144, the shield rectangular coordinates of the window being opened by the application program 98 are recalled. These coordinates were stored by step 126 of the Overlay Shield Cursor Patch process 110. Next, in a step 146, the Blending Engine 114 of FIG. 7 is called. After the Blending Engine 146 has completed its process, a step 148 passes the process control back to the Show Cursor Routine 108 such that the Frame Rect routine 104 had no knowledge of the intervening steps 112 and 114. The process is then completed as indicated at 150.

Figure 10:
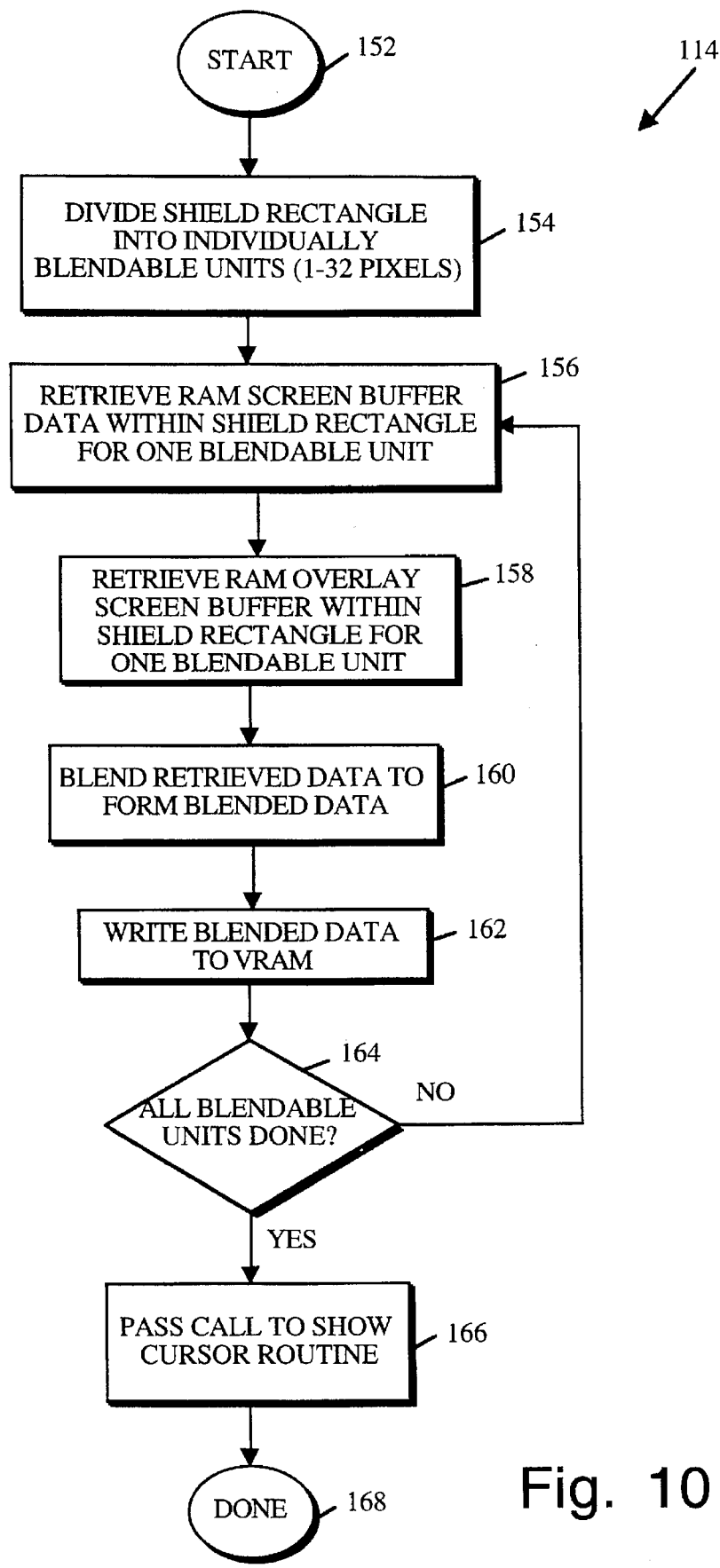
FIG. 10 is a flow diagram illustrating the "Blending Engine" 114 of FIG. 7.

FIG. 10 illustrates the process 114 of FIG. 7 in greater detail. The "Blending Engine" process 114 begins at 152 and, in a step 154, the shield rectangle is divided into individually blended units. For example, these blendable units can be anywhere in the range of 1 to 32 pixels, where a pixel is the smallest display unit possible on the screen 40. Next, in a step 156, the RAM screen buffer data within the shield rectangle is retrieved for one blendable unit. In a step 158, the RAM overlay image buffer from within the shield rectangle has been retrieved for the one blendable unit. The data retrieved from steps 156 and 158 is blended to form blended data in the step 160. Next, in a step 162, the blended data is written to VRAM to be displayed on the screen 40. Next, in a step 164, it is determined whether all of the blendable units created by step 154 have been blended by the process steps of 156–162. If not, the loop comprising steps 156–164 is repeated. If step 164 determines that all blendable units have been blended, the call that was initially made by the Frame Rect routine 104 is passed to the Show Cursor Routine 108 in a step 166, and the process is completed at 168. Again, the Frame Rect routine 104 is unaware of the activities of process 114 and, instead, believes that its call was passed directly to the Show Cursor Routine 108 for processing.

FIGS. 10A–10F are used, as an example, to further explain the process 114 of FIG. 10. FIG. 10A represents the RAM shield buffer within the shield rectangle, and has been divided into 16 individually-blendable units. These units are arranged in a four-by-four matrix, where the rows have been numbered 1, 2, 3, and 4. FIG. 10B illustrates the RAM screen overlay buffer in the shield rectangle, and again has 16 individually-blendable units formed in a four-by-four array, with the rows numbered 1, 2, 3, and 4. In FIG. 10C, the row 1 from FIG. 10A and the row 1 from FIG. 10B are blended together to form a blended row 170C. In FIG. 10D, rows 2 from FIGS. 10A and 10B are blended together to form a blended row 170D. In FIG. 10E, rows 3 and 4 are blended together to form a blended row 170E, and in FIG. 10F rows 4 from FIGS. 10A and 10B are blended together to form a blended row 170F. This "blending" process allows a base image on the screen 40 to be seen through a translucent overlay image produced by the process of the present invention.

Figure 11:
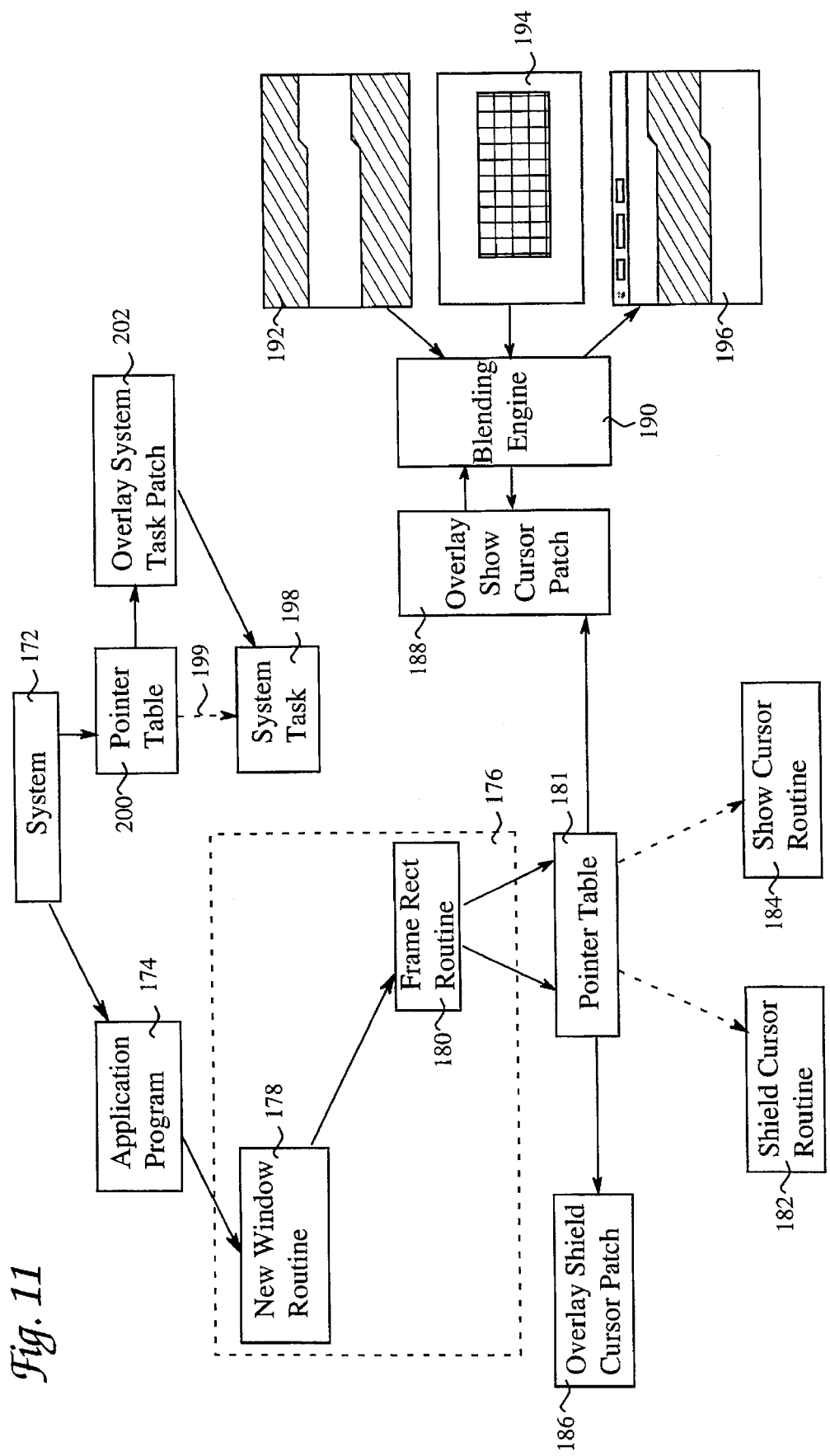
FIG. 11 illustrates an alternate embodiment of the "Display an Overlay Image" step 90 of FIG. 6B.

FIG. 11 illustrates an alternate embodiment of the present invention which has been optimized for screen-writing speed. While the process of FIG. 7 works very well, it requires that the entirety of the base screen 116 be rewritten whenever the blended image 120 is to be refreshed. The alternative process of FIG. 11 only refreshes the portions of the blended image that needs to be refreshed, thereby greatly increasing the writing speed to the screen 40.

Much of the operation of the process illustrated in FIG. 11 is similar to that described in FIG. 7. An operating system 172 supports an application program 174 which, when it wants to open a window, calls a set of routines 176 including a "New Window routine" 178 and Frame Rect routine 180. The Frame Rect routine 180 then, as before, attempts to first call the Shield Cursor Routine 182 first and then the Show Cursor Routine 184. Again, as before, the pointer table is modified such that when the Frame Rect routine tries to call the Shield Cursor Routine 182, it instead calls the Overlay Shield Cursor Patch 186 of the present invention, and when the Frame Rect routine 180 attempts to call the Show Cursor Routine 184 it instead calls the Overlay Show Cursor Patch 188. The Overlay Show Cursor Patch calls a Blending Engine 190 which blends a partial base image 192 with an overlay image 194 to create a blended image 196.

The system 172, as part of its functioning, will make periodic calls to various system task processes 198. The system task 198 performs such functions as execute "Device Driver Code" and "Desk Accessory Code." The process of the present invention opportunistically takes advantage of these periodic system task calls by modifying a pointer table 200 to turn over process control to an Overlay System Task Patch 202. This Overlay System Task Patch, along with the Overlay Shield Cursor Patch 186, the Overlay Show Cursor Patch 188, and the Blending Engine 190 comprise the overlay utility 80 of FIGS. 6A and 6B in this second preferred embodiment.

FIG. 12 is used to illustrate the operation of the Blending Engine 190 of FIG. 11 in greater detail. The process 90 of FIG. 6B remaps certain pages of VRAM to the RAM screen buffer when an overlay image contains objects that overlap these pages. The RAM overlay screen buffer 194 is then merged with the RAM screen buffer 192 in the Blending Engine 190 by a process similar to that previously described and inserts the blended image into a "hole" 204 of the VRAM screen buffer 196. The portions 206 and 208 of the VRAM screen buffer remain the VRAM since the overlay image of the present invention does not overlap pages comprising these portions of the screen.

Since portions 206 and 208 are pages of VRAM screen buffer memory which are not overlapped, at least in part, by an overlay image of the present invention, these portions 206 and 208 can remain in VRAM screen buffer. VRAM screen buffer is much faster memory for video purposes than the RAM screen buffer 192. Also, changes made to the RAM screen buffer 192 or to the RAM overlay screen buffer 194 that do not cause a change in portions 206 and 208 do not require that the system blend the portions 206 and 208. The combination of these factors substantially increase the blending speed of the VRAM screen buffer and therefore of the display on screen 40.

FIG. 13 illustrates the Overlay Shield Cursor Patch process 186 of FIG. 11 in greater detail. Process 186 begins at 210 and, in a step 212, it intercepts a call to the Shield Cursor Routine 182. This interception is preferably accomplished in a manner analogous to that previously described with reference to FIG. 7. The coordinates of the shield rectangle are then stored in a step 214 for future blending operations. This is similar to the step 126 of FIG. 8. Next, in a step 216, it is determined whether there is a drawing to the overlay image of the present invention. If there is, a step 218 determines whether this is the first time that there has been a drawing to the overlay image. If it is, a step 220 creates the overlay buffer 194 of FIG. 12. If not, a step 222 determines which pages of VRAM screen buffer 196 are "touched" by the overlay drawing operation. Next, in a step 224, data is copied from VRAM 196 to the RAM screen buffer 192 for each "touched" page. Next, in a step 228, the buffer overflow error (if any) is recorded. Next, a step 230 passes the original Frame Rect routine call to the Shield Cursor Routine 182. This step 230 is also performed directly after step 216 if there was no drawing to the overlay image. The process 186 is then completed at 232.

Figure 14A:
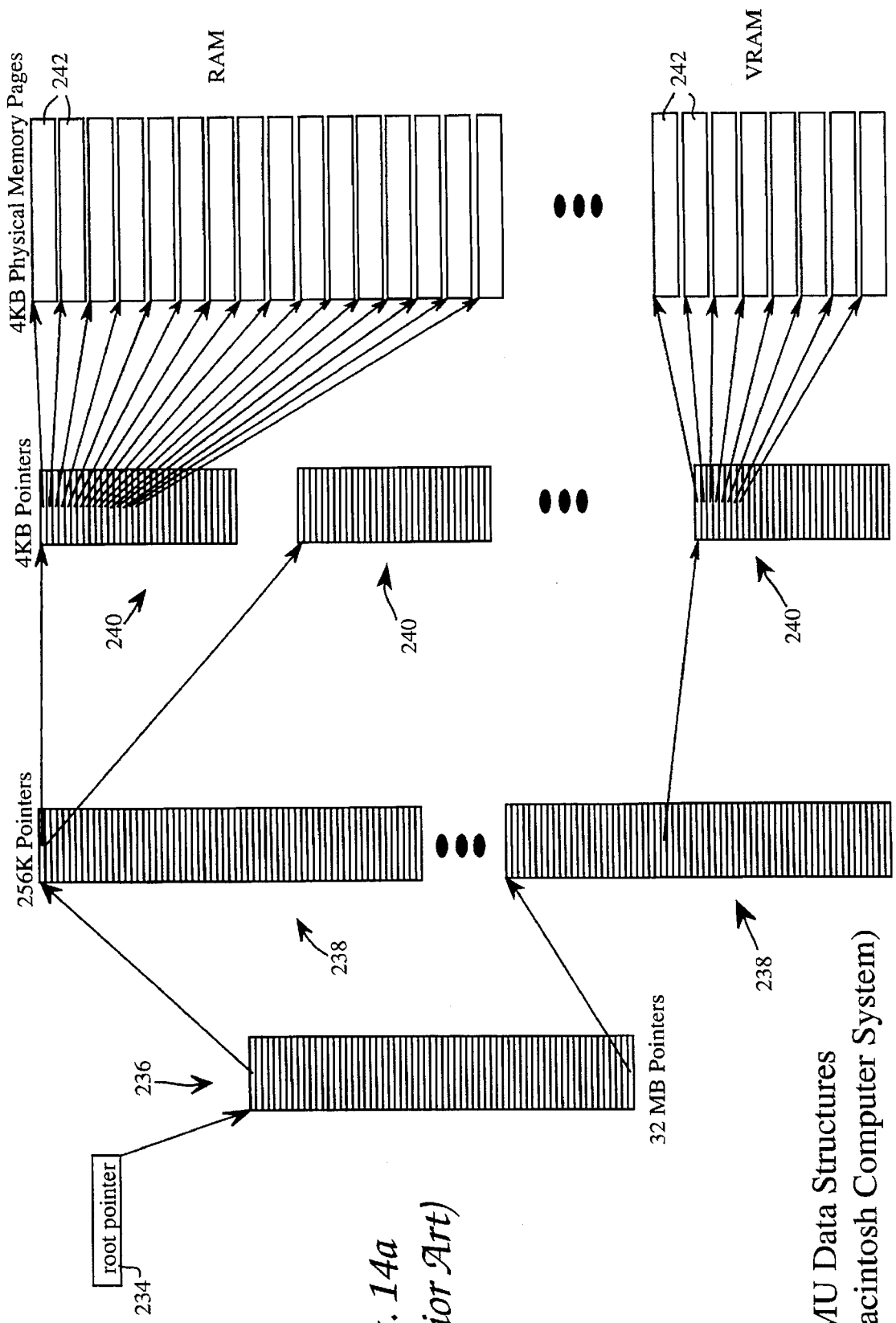
FIG. 14a illustrates a known memory management unit (MMU) data structure.

FIG. 14A illustrates a prior art memory management (MMU) data structure for a Macintosh computer system. The Macintosh computer system uses a tree-type MMU data structure in which a root pointer 234 points to a stack 236 of 32 megabyte (MB) pointers, each of which point to a stack 238 of 256 kilobyte (KB) pointers, each of which point to a stack 240 of 4 KB pointers, each of which point to 4 KB physical memory pages 242. Some of these 4 KB physical memory pages reside in general system RAM, and some of these 4 KB physical memory pages reside in VRAM. This MMU data structure is well known to those skilled in the art of programming Macintosh computer systems.

FIG. 14B illustrates modifications that the present invention has made to the MMU data structures to accomplish step 226 of FIG. 13. Essentially, step 226 selectively modifies some of the pointers in the 4 KB pointer stacks 240 to "trick" the system into writing images that are intended for VRAM into RAM and vice versa. For example, process 226 can redirect a pointer from the 4 KB physical memory page 242A of the VRAM to the 4 KB physical memory page 242B of the RAM as indicated by arrow 244A. Also, a 4 KB pointer of a stack 240 can be modified as indicated by the arrow 244B such that data which was to be written into 4 KB physical memory page 242B is, instead, redirected to the 4 KB physical memory page 242A of the VRAM. This modification of the MMU data structure, therefore, effectively "swaps" pages 242A and 242B, thus causing a portion of the screen (as stored in the VRAM memory page 242A) to be drawn "off screen" in RAM memory page 242b.

The MMU modification of FIG. 14B takes advantage of the fact that the Macintosh operating system supports multiple monitors. These monitors exist in a single coordinate plane, in which the upper-left corner of the main screen is the origin (the point with coordinate value (0,0)). The overlay screen exists in the same coordinate space, but it is off in an area not normally occupied by monitors. The upper-left hand corner of the overlay screen, for example, can be at coordinate (−10,000, −10,000). It is very unlikely that using this remote area of coordinate space will affect existing monitor set ups. In consequence, a "pseudo" screen is recognized by the operating system where the overlay image 194 resides. The blending operation, then, blends the images of the actual screen 40 and this "pseudo" screen which includes the overlay image.

Figure 15:
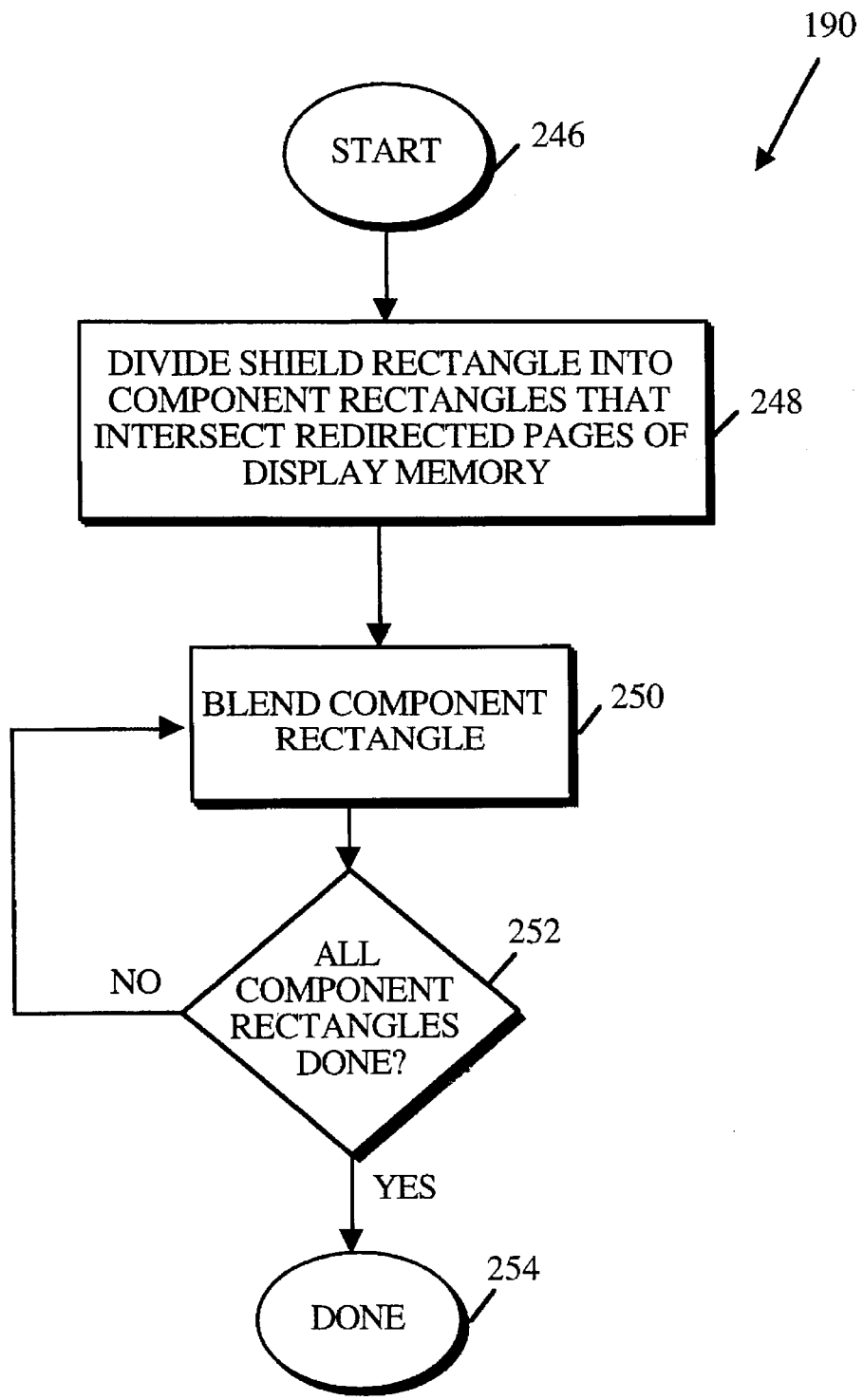
FIG. 15 is a flow diagram illustrating the operation of the "Blending Engine" 190 of FIG. 11.

FIG. 15 illustrates the process 190 of FIG. 11 in greater detail. The "Blending Engine" process 190 begins at 246 and, in a step 248, the shield rectangle is divided into component rectangles that intersect redirected pages of the display memory. The redirected page concept was explained with reference to FIG. 14B. Next, in a step 250, the component rectangles are blended. This is accomplished as previously described with reference to FIG. 10 and FIGS. 10A–10F. Next, in a step 252, it is determined whether all component rectangles have been completed. If not, steps 250 and 252 are continued in a loop until all component rectangles are done at which time the process is completed as indicated at 254.

Figure 16:
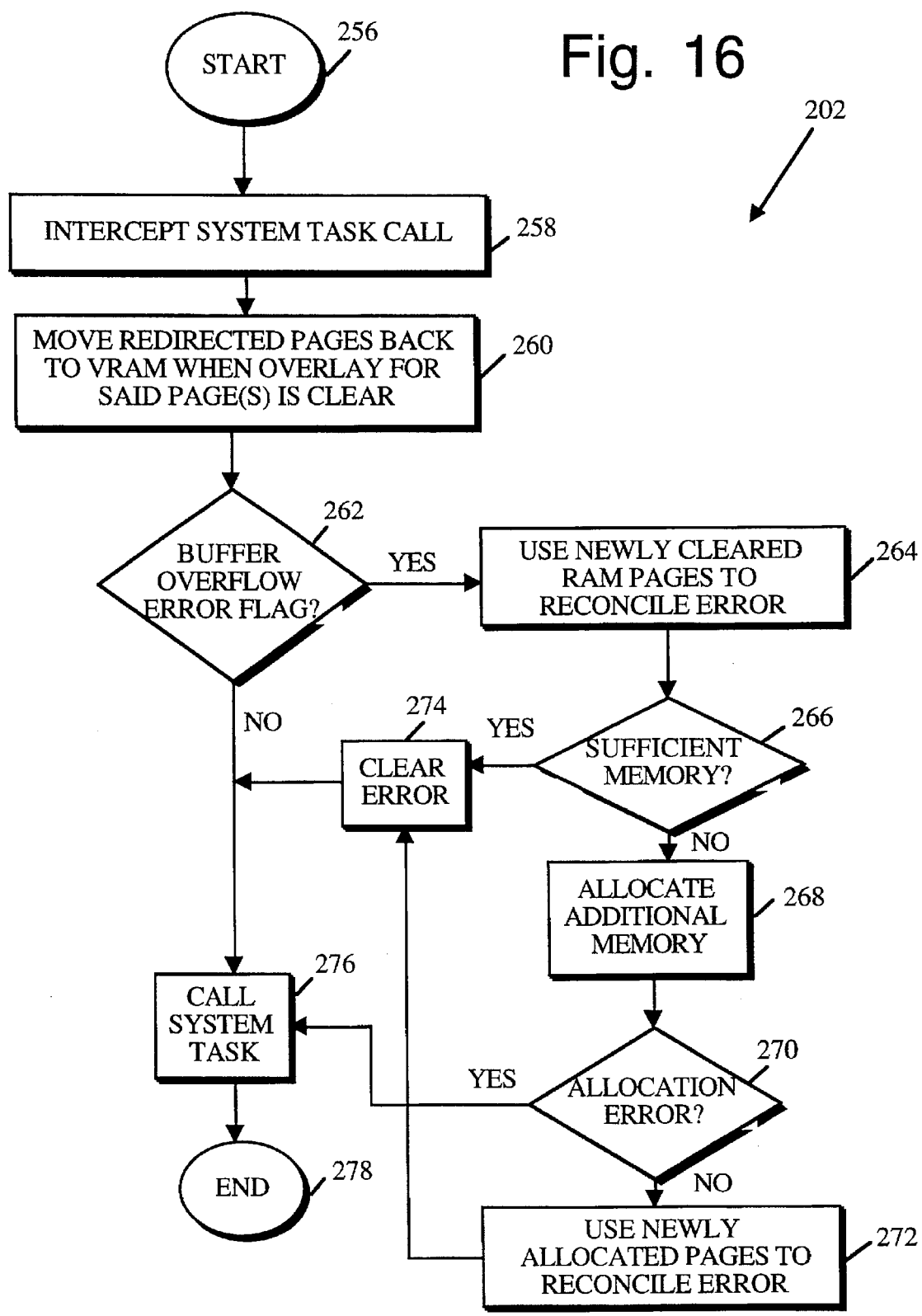
FIG. 16 is a flow diagram illustrating the "Overlay System Task Patch" 202 of FIG. 11.

In FIG. 16, the Overlay System Task Patch process 202 is described in greater detail. As mentioned previously, process 202 is an additional portion of the overlay utility of this second embodiment of the present invention. The process 202 needs to be implemented periodically and, since the system periodically makes calls to various system tasks, the process 202 uses these periodic system task calls to activate its processes. Alternatively, other activation methods could be used to periodically start the process 202. The process 202 starts at 256 and, in a step 258, process 202 intercepts a system task call made by system 172. Next, in a step 260, redirected pages are moved back to VRAM when the overlay image for those pages is clear, i.e., when all pixels of the overlay contain a value of zero for a given screen page. In a decision step 262, it is determined whether a buffer overflow error flag has been set. If it has, a step 264 uses the newly cleared RAM pages to reconcile the error. Then, in a step 266, it is determined whether there is sufficient memory available to complete the task. If not, additional memory is allocated in a step 268. Next, a step 270 determines whether there was an allocation error made during the allocation step of 268. If not, the newly allocated pages are used to reconcile the error in a step 272 and the error is cleared in step 274. This step 274 is also executed if there was determined to be sufficient memory in step 266. Next, the process 202 calls the system task 198 in a step 276 and the process is completed as indicated at 278. The call system task step 276 is also executed if step 270 indicates that there is an allocation error in the additional memory. The system 172 is unaware of the modification of the pointer table 200 and of the process of the Overlay System Task Patch 202 and, simply believes that the system task 198 has been called directly as indicated by arrow 199 on FIG. 11.

Figure 17:
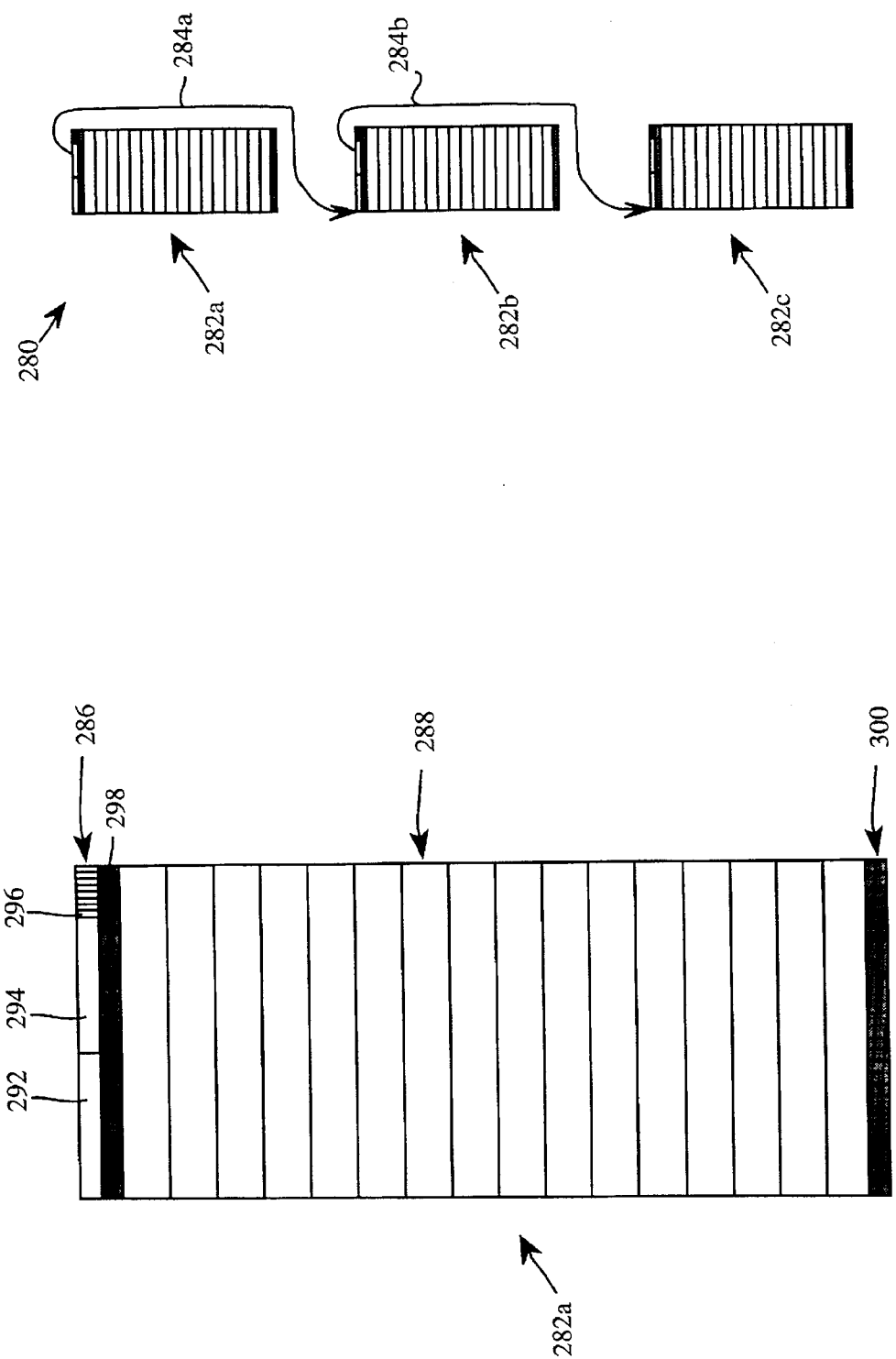
FIGS. 17a and 17b illustrates a RAM memory pool format used in the present invention.

In FIGS. 17A and 17B a preferred RAM memory pool format for the present invention is disclosed. Referring to FIG. 17A, the RAM memory pool 280 comprises a number of blocks 282A, 282B, 282C, etc. Each block preferably contains 16 pages of memory which are used to remap portions of the display monitor memory using the MMU as previously described. The blocks are chained together by pointers as represented by arrows 284. With additional reference to FIG. 17B, each block 282 includes a header portion 286, a data portion 288, and a trailer portion 290. The header portion 286 includes two pointer portions 292 and 294 and an allocation portion 296. The header portion 286 also includes a padding portion 298. The pointer portion 292 points to the first page in the current block 282, and is preferably 32 bits in length. The pointer 294 is also preferably 32 bits in length, and points to the next block in the RAM memory pool. In this example, the pointer 294 of block 282A points to the pointer 292 of the block 282B as indicated by the arrow 284A. Similarly, the pointer 294 of block 282B points to the pointer 292 of block 282C as indicated by the arrow 284B.

The blocks are chained together as indicated in FIG. 17A. When a free page is needed, the page allocator traverses the chain searching for a block which contains a free page. When it finds one, it sets the corresponding allocation flag 296 to indicate that the page is now in use. If no free pages are found, a new block 282 is allocated, and is connected to the end of the chain. A page is then allocated from the new block.

The purpose of the header "padding" is for page alignment. The pages 288 are aligned in memory so that the MMU can properly map onto them. The number of bytes in the header padding 298 depends on where the header happened to be allocated in memory. If it is only a few bytes from a page boundary, then the header padding is only a few bytes in length. In some cases, the header padding may approach a full page in size (4K in this instance). Trailer "padding" 300 contains the remaining bytes in the block, which is allocated at a fixed size. Again, this fixed size in the preferred embodiment is 4K.

Figure 18:
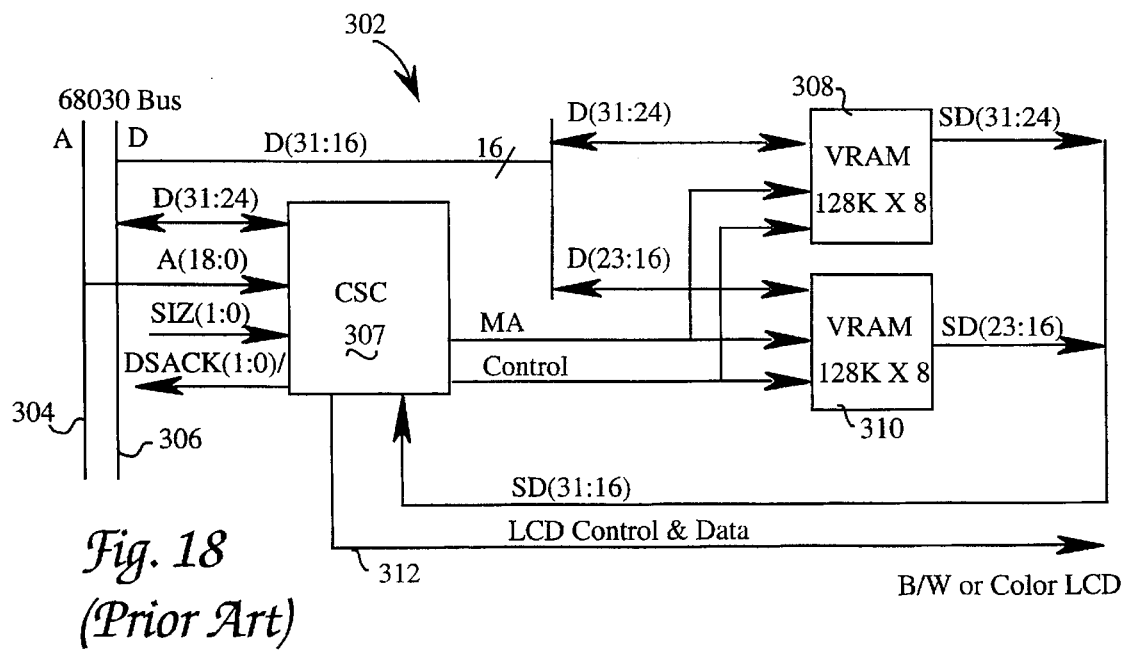
FIG. 18 illustrates a video driver circuitry of a prior art Macintosh computer system produced by Apple Computer, Inc. of Cupertino, Calif.
Figure 19:
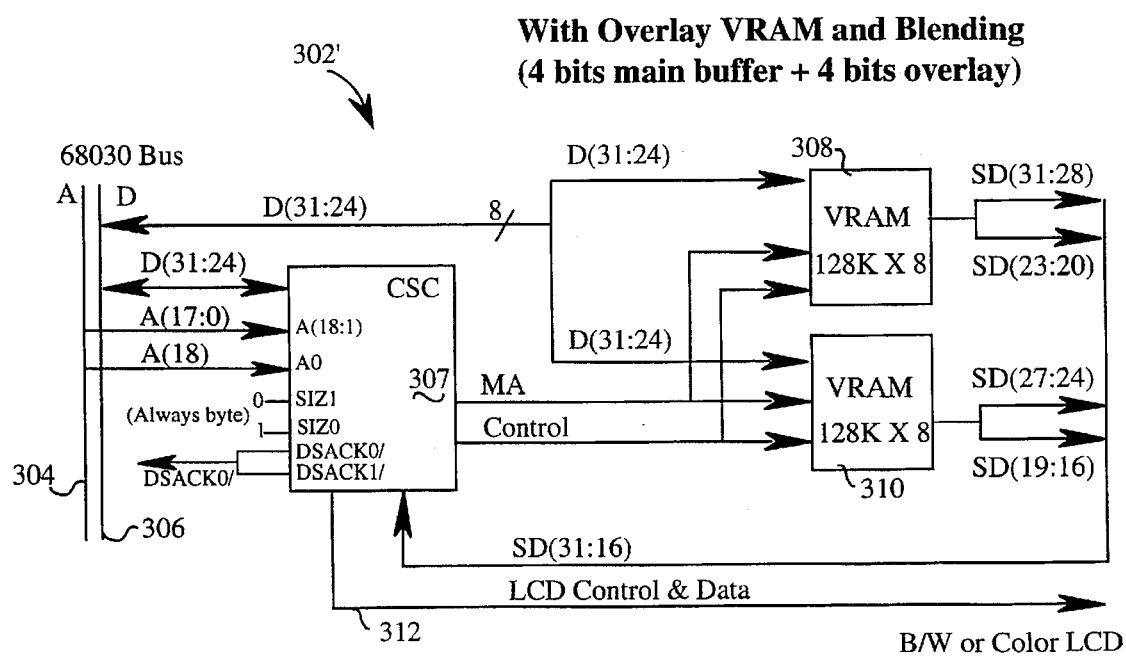
FIG. 19 illustrates video driver circuitry in accordance with the present invention which provides overlay VRAM and blending capabilities.

FIGS. 18 and 19 are used to illustrate an alternate embodiment of the present invention wherein the blending of the base image and the overlay image are performed in the video driver hardware rather than within a computer implemented process on the CPU. In FIG. 18, a prior art video driver system of a Macintosh computer system is illustrated. In this prior art example, the video driver circuit 302 is coupled to an address bus 304 and a data bus 306 connected to a Motorola 68030 microprocessor. The video driver circuit 302 includes a color screen controller CSC 306, and two banks of VRAM 308 and 310. The CSC 306 produces LCD control and data on a bus 312 which control a black and white or color liquid crystal display (LCD). For example, the video driver circuit 302 can drive an Esher LCD circuit for a 640 by 400 bit display, with eight bits of information per pixel.

In FIG. 19, a modified video driver circuit 302' is coupled to the same Motorola 68030 address bus 304 and data bus 306, and includes the same CSC 307, VRAM 308, and VRAM 310. However, the data and address connections have been modified as indicated. In this implementation, data from the screen buffer and the overlay screen buffer are input into the VRAM of modified video driver circuit 302', and combined therein to provide LCD control and blended data on the bus 312. Again, the video driver circuit 302' can control a black and white or color LCD, except this time instead of having eight bits per pixel, there are four bits allocated to the base image and four bits allocated to the overlay image. A color look-up table (CLUT)—not shown— of CSC 307 is loaded with 256 entries which detail each possible combination of bits from the 4 bit screen and the 4 bit overlay, and what the resultant blended value is. The color capability of the CSC 307 is therefore no longer used for color look-up, and is instead used for the blending values. This technique makes it possible to use off-the-shelf integrated circuits, such as the CSC 307 which is available from Chips & Technologies, Inc. of San Jose, Calif., to perform an entirely new operation.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. A method for providing a translucent overlay image on a screen of a computer system comprising:

displaying a utility palette including a first utility icon responsive to initiate a utility executable on said computer system;

displaying a base image on said screen of said computer system, said base image being produced by a computer implemented process running on said computer system;

in response to said utility icon being selected, opaquely displaying an overlay image on said screen, said overlay image corresponding to said utility, said overlay image including a translucency icon, and said overlay image initially being opaque such that overlapped portions of said base image are not visible; and in response to said translucency icon being selected, translucently displaying said overlay image such that overlapped portions of said base image directly beneath said overlay image can be seen through said overlay image simultaneously with said overlay image.

2. A method as recited in claim 1 wherein said base image is produced by a first computer implemented process running on said computer system, and said overlay image is produced by said utility which is a second computer implemented process running on said computer system.

3. A method as recited in claim 2 wherein said second computer implemented process intercepts screen inputs which contact said overlay image and processes said screen inputs.

4. A method as recited in claim 3 further comprising creating screen inputs with a pointing device.

5. A method as recited in claim 4 further comprising selecting a stylus as said pointing device, and wherein said screen means comprises an input tablet means responsive to said stylus.

6. A method as recited in claim 3 wherein said second computer implemented process is further operative to update said first computer implemented process according to the step of processing said screen inputs.

7. A method as recited in claim 3 wherein said overlay image is a keyboard image comprising icons which represent alphanumeric characters.

8. A method as recited in claim 1 wherein said computer system is a pointer based computer system, said first utility icon is selected by dragging said first utility icon off of said utility palette with said pointer, and said overlay image is displayed in a location correlated to where said first utility icon is dragged.

9. A method for displaying images on a screen of a computer system comprising:

displaying a utility palette including a first utility icon responsive to initiate a utility executable on said computer system;

displaying a base image on said screen of a computer system;

in response to said utility icon being selected, opaquely displaying an overlay image on said screen, said overlay image corresponding to said utility, said overlay image including a translucency icon, and said overlay image initially being opaque such that overlapped portions of said base image are not visible; and in response to said translucency icon being selected, displaying said overlay image such that portions of said base image which are directly beneath said overlay image are at least partially visible through said overlay image simultaneously with said overlay image.

10. A method as recited in claim 9 wherein said base image and said overlay image are produced by independent computer implemented processes.

11. A method as recited in claim 9 wherein said base image is active to receive user inputs.

12. A method as recited in claim 11 wherein said overlay image is active to receive user inputs.

13. A method as recited in claim 9 wherein said overlay image is active to receive user inputs.

14. A method for displaying images on a screen of a pen computer system having a central processing unit (CPU), which CPU is coupled to said screen, comprising the steps of:

displaying a utility palette including an overlay icon;

running an application program on said central processing unit of said pen computer system to produce a base image on said screen;

in response to said overlay icon being selected, running an overlay program on said CPU to opaquely display an overlay image on said screen, said overlay image including a translucency icon, said overlay image initially being opaque such that overlapped portions of said base image are not visible; and in response to said overlay icon being selected, translucently displaying said overlay image such that portions of said base image which are directly beneath said overlay image are at least partially visible through said overlay image.

15. A method as recited in claim 14 wherein said step of running an overlay program comprises the steps of:

intercepting screen inputs which contact said translucent overlay image;

processing said intercepted screen inputs in said CPU; and updating said application program based upon said processed screen inputs.

16. A method as recited in claim 15 wherein said step of translucently displaying said overlay image comprises the step of blending said overlay image with said base image.

17. A method as recited in claim 16 wherein said step of blending is accomplished in said CPU.

18. A method as recited in claim 16 wherein said step of blending is accomplished externally to said CPU.

19. A method as recited in claim 15 wherein said step of processing said intercepted screen inputs includes redirecting at least one page of memory within memory management means of said computer system.

20. A pen computer system comprising:

a central processing unit (CPU);

screen means coupled to said CPU;

means coupled to said screen means for displaying a base image on said screen means; and means coupled to said screen means for displaying an overlay image on said screen means, said means operable to opaquely display said overlay image such that portions of said base image which are directly beneath said overlay image are not visible, said means for displaying an overlay image further operable to translucently display said overlay image such that portions of said base image which are directly beneath said overlay image are at least partially visible through said overlay image, said means for displaying said overlay image responsive to a users selection to toggle between (i) opaquely displaying said overlay image and (ii) translucently displaying said overlay image.

21. A pen computer system as recited in claim 20 further comprising:

tablet means coupled to said CPU; and stylus means engageable with said tablet means and operative to enter data into said CPU via said tablet means.

22. A pen computer system as recited in claim 21 wherein said tablet means forms a part of said screen means, such that said stylus means can engage said screen means to enter data into said CPU.

23. A pen computer system as recited in claim 22 wherein said means for displaying a base image comprises:

a first computer implemented process running on said CPU producing first video data; and video driver means coupled between said CPU and said screen means, said video driver means being receptive to said first video data.

24. A pen computer system as recited in claim 23 wherein said means for displaying an overlay image comprises:

a second computer implemented process running on said CPU producing second video data; and video driver means coupled between said CPU and said screen means, said video driver means being receptive to said second video data.

25. A pen computer system as recited in claim 24 further comprising means for blending said first video data and said second video data to produce a blended image on said screen means.

26. A pen computer system as recited in claim 25 wherein said means for blending comprises said second computer implemented process.

27. A pen computer system as recited in claim 25 wherein said means for blending comprises said video driver means.

* * * * *